United States Patent
Xiong et al.

(10) Patent No.: US 11,991,728 B2
(45) Date of Patent: May 21, 2024

(54) TECHNIQUES FOR HIGH FREQUENCY WIRELESS COMMUNICATION

(71) Applicant: Intel Corporation, Santa Clara, CA (US)

(72) Inventors: Gang Xiong, Portland, OR (US); Daewon Lee, Portland, OR (US); Yingyang Li, Beijing (CN); Alexei Davydov, Nizhny Novgorod (RU); Bishwarup Mondal, San Ramon, CA (US); Gregory Morozov, Nizhny Novgorod (RU); Lopamudra Kundu, Sunnyvale, CA (US); Yongjun Kwak, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 339 days.

(21) Appl. No.: 17/005,132

(22) Filed: Aug. 27, 2020

(65) Prior Publication Data

US 2020/0396744 A1 Dec. 17, 2020

Related U.S. Application Data

(60) Provisional application No. 62/928,754, filed on Oct. 31, 2019, provisional application No. 62/910,290, (Continued)

(51) Int. Cl.
*H04W 72/0453* (2023.01)
*H04L 5/00* (2006.01)
*H04L 5/10* (2006.01)
*H04L 27/26* (2006.01)
*H04W 56/00* (2009.01)
(Continued)

(52) U.S. Cl.
CPC ............ *H04W 72/53* (2023.01); *H04L 5/0051* (2013.01); *H04L 5/10* (2013.01); *H04L 27/2607* (2013.01); *H04W 56/001* (2013.01); *H04W 72/0446* (2013.01); *H04W 72/0453* (2013.01); *H04W 72/23* (2023.01)

(58) Field of Classification Search
CPC .......... H04W 72/0493; H04W 56/001; H04W 72/042; H04W 72/0446; H04W 72/0453; H04L 5/0051; H04L 5/10; H04L 27/2607; H04L 5/001; H04L 27/26134; H04L 27/2636; H04B 7/0695; H04B 7/088
See application file for complete search history.

(56) References Cited

U.S. PATENT DOCUMENTS

2019/0110277 A1* 4/2019 Bhattad ................ H04L 5/0053
2021/0297204 A1* 9/2021 Davydov ............ H04L 27/2605
(Continued)

*Primary Examiner* — Jae Y Lee
*Assistant Examiner* — Aixa A Guadalupe Cruz
(74) *Attorney, Agent, or Firm* — Schwabe, Williamson & Wyatt, P.C.

(57) ABSTRACT

Various embodiments provide techniques for high frequency wireless communication. For example, embodiments include techniques for a transmission scheme for physical downlink control channel (PDCCH) with single carrier waveform; synchronization signal block (SSB) rate matching indication for NR unlicensed operation; beam acquisition for frequency division duplex (FDD) systems; and/or SSB patterns and multiplexing for downlink transmissions. Other embodiments may be described and claimed.

15 Claims, 28 Drawing Sheets

DMRS and PDCCH in a SC-FDE symbol

Related U.S. Application Data filed on Oct. 3, 2019, provisional application No. 62/910,249, filed on Oct. 3, 2019, provisional application No. 62/892,433, filed on Aug. 27, 2019.

(51) Int. Cl.
*H04W 72/0446* (2023.01)
*H04W 72/23* (2023.01)
*H04W 72/53* (2023.01)

(56) References Cited

U.S. PATENT DOCUMENTS

2022/0085940 A1\* 3/2022 Xiong ............... H04L 27/2636
2022/0116252 A1\* 4/2022 Xiong ............... H04L 27/2607

\* cited by examiner

Figure 1. Comparison between OFDM and SC-FDE transmission schemes

Figure 2. CORESET configuration for PDCCH with SC-FDE waveform

Figure 3. TDM of multiple PDCCHs in a CORESET

Figure 4. CCE-to-REG mapping for SC-FED waveform

Figure 5. CCE mapping for SC-FDE waveform

Figure 6. DMRS and PDCCH in a SC-FDE symbol

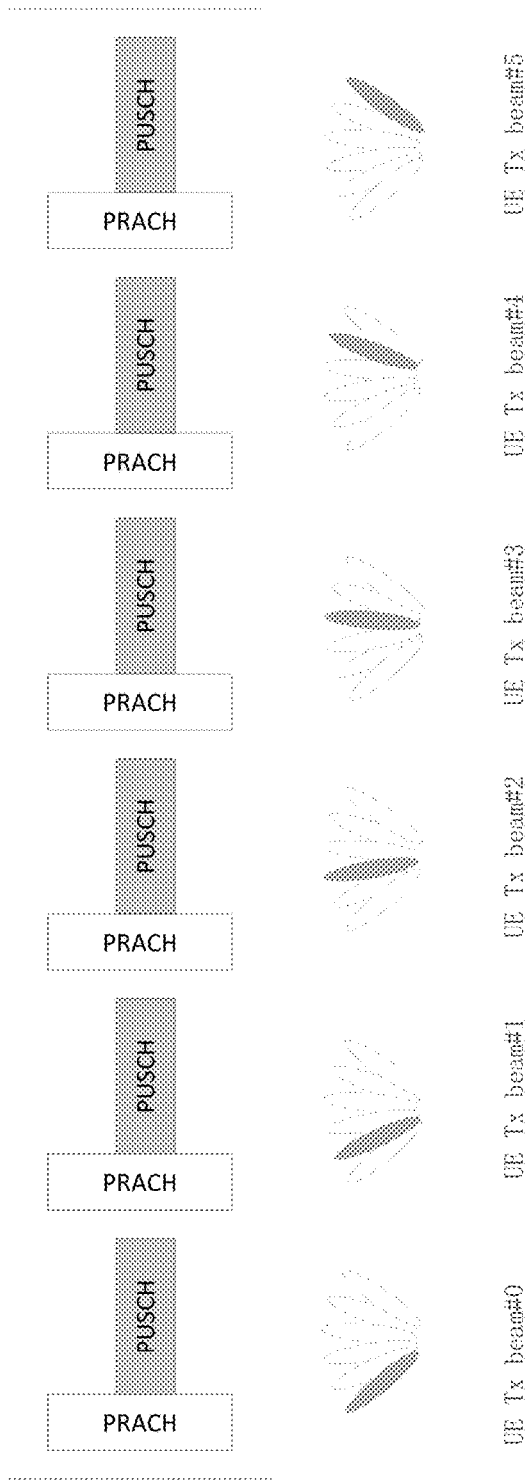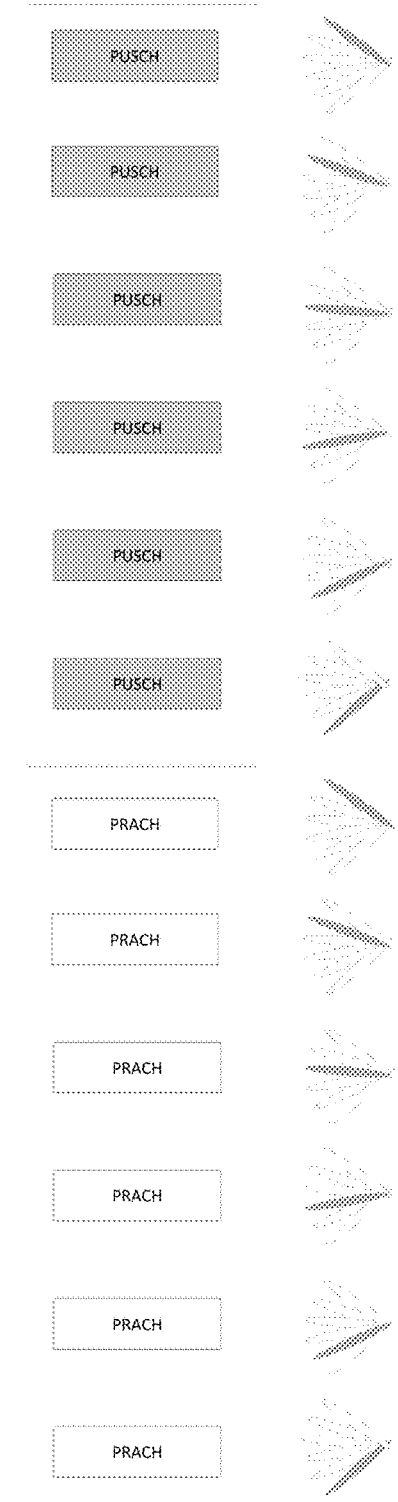
Figure 15
Figure 16

TECHNIQUES FOR HIGH FREQUENCY WIRELESS COMMUNICATION

CROSS REFERENCE TO RELATED APPLICATION

The present application claims priority to U.S. Provisional Patent Application No. 62/892,433, titled "SYSTEM AND METHODS ON THE TRANSMISSION SCHEME OF PDCCH FOR SINGLE CARRIER WAVEFORM," which was filed Aug. 27, 2019; U.S. Provisional Patent Application No. 62/910,290, titled "SSB RATE MATCHING INDICATION FOR NR UNLICENSED OPERATION," which was filed Oct. 3, 2019; U.S. Patent Application No. 62/910,249, titled "BEAM ADQUISITION FOR FREQUENCY DIVISION DUPLEX (FDD) SYSTEMS, which was filed Oct. 3, 2019; and U.S. Provisional Patent Application No. 62/928,754, titled "SYNCHRONIZATION SIGNAL BLOCK (SSB) PATTERNS AND MULTIPLEXING FOR DOWNLINK (DL) TRANSMISSIONS," the disclosures of which are hereby incorporated by reference.

FIELD

Embodiments relate generally to the technical field of wireless communications.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 15 illustrates an example of beam sweeping based MsgA transmission with consecutive PRACH and PUSCH in one MsgA transmission, in accordance with various embodiments.

FIG. 16 illustrates one example of beam sweeping based MsgA transmission with separate PRACH and PUSCH, in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Embodiments herein provide techniques for comunication on frequencies greater than 6 GHz, and/or greater than 52.6 GHz. Although embodiments are described with respect to these carrier frequencies, it is understood that some aspects may be applied to communications on other frequencies.

Various embodiments include, for example:
  a transmission sheme for physical downlink control channel (PDCCH) with single carrier waveform;
  synchronization signal block (SSB) rate matching indication for NR unlicensed operation;
  beam acquisition for frequency division duplex (FDD) systems; and
  SSB patterns and multiplexing for downlink transmissions.

Transmission Scheme of PDCCH for Single Carrier Waveform

In NR Release 15, system design is targeted for carrier frequencies up to 52.6 GHz with a waveform choice of cyclic prefix—orthogonal frequency-division multiplexing (CP-OFDM) for DL and UL, and additionally, Discrete Fourier Transform-spread-OFDM (DFT-s-OFDM) for UL. However, for carrier frequency above 52.6 GHz, it is envisioned that single carrier based waveform is needed in order to handle issues including low power amplifier (PA) efficiency and large phase noise.

Figure 1:
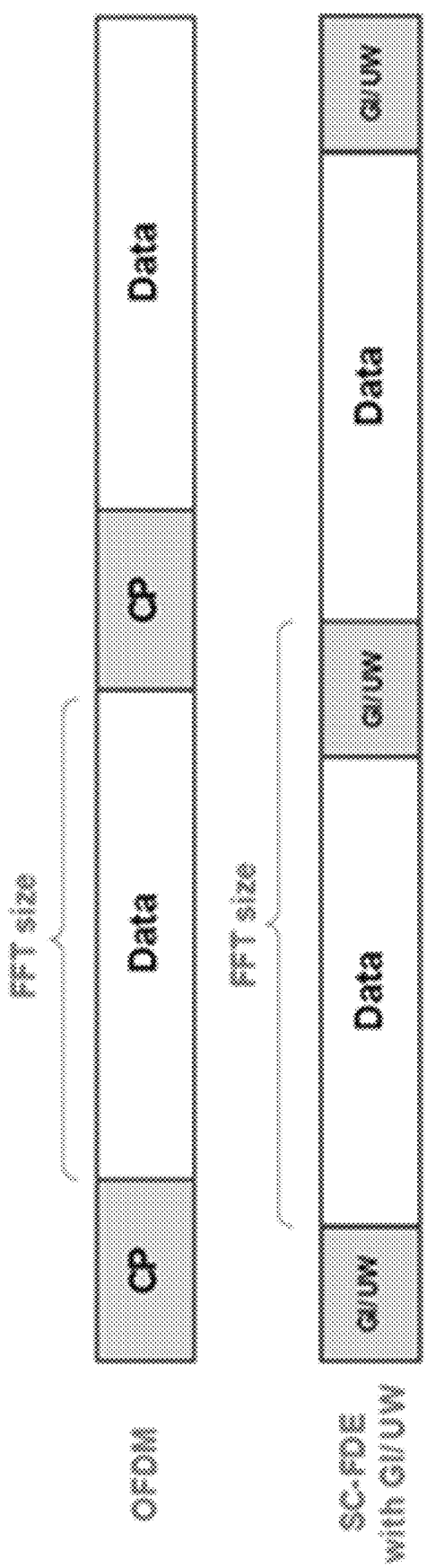
FIG. 1 schematically illustrates a comparison between orthogonal frequency divisional multiplexing (OFDM) and single carrier with frequency domain equalizer (SC-FDE) transmission schemes, in accordance with various embodiments.

For single carrier based waveform, DFT-s-OFDM and single carrier with frequency domain equalizer (SC-FDE) can be considered for both DL and UL. FIG. 1 illustrates the transmission scheme of OFDM and SC-FDE systems, respectively. For OFDM based transmission scheme including DFT-s-OFDM, a cyclic prefix (CP) is inserted at the beginning of each block, where the last data symbols in a block is repeated as the CP. Typically, the length of CP exceeds the maximum expected delay spread in order to overcome the inter-symbol interference (ISI).

For SC-FDE transmission scheme, a known sequence (guard interval (GI), unique word (UW), etc.) or a CP can be inserted at both the beginning and end of one block or at the beginning of the data block, respectively. Further, a linear equalizer in the frequency domain can be employed to reduce the receiver complexity. Compared to OFDM, SC-FDE transmission scheme can reduce Peak to Average Power Ratio (PAPR) and thus allow the use of less costly power amplifier.

In Rel-15 NR, CP-OFDM waveform is applied for the transmission of PDCCHs, and multiple PDCCHs can be multiplexed in a frequency division multiplexing (FDM) manner. However, for system operating above 52.6 GHz carrier frequency, when SC-FDE waveform is applied for the transmission of PDCCH, PDCCHs for same or different UEs may not be multiplexed in a FDM manner. In this case, certain mechanisms on the transmission scheme of PDCCH needs to be defined.

In this disclosure, systems and methods are described for a transmission scheme of PDCCH for single carrier waveform for system operating above 52.6 GHz carrier frequency. More specifically, embodiments herein include:
  Transmission scheme of PDCCH for single carrier waveform for above 52.6 GHz carrier frequency
  DMRS generation for PDCCH with SC-FDE waveform In Rel-15 NR, control resource set (CORESET) is defined as a set of resource element groups (REG) with one or more symbol duration under a given numerology within which UE attempts to blindly decode downlink control information. For physical downlink control channel (PDCCH), a REG is defined as a physical resource block (PRB) with one OFDM symbol and 1 control channel element (CCE) has 6 REGs. Further, a PDCCH candidate consists of a set of CCEs and can be mapped contiguously or non-contiguously in frequency. CCE-to-REG mapping can be either localized or distributed in frequency domain. However, for a given CORESET, only one CCE-to-REG mapping is configured. When distributed CCE-to-REG mapping is employed, a block interleaver is used to distribute the REGs within one CCE in frequency in the CORESET.

Note that for a given bandwidth part (BWP) in a cell, maximum number of CORESETs for a UE is 3. In addition, a control search space is associated with a single CORESET and multiple search spaces can be associated with a CORESET. In this case, for a given CORESET, different search spaces (e.g., common search space and UE-specific search space) can have different periodicities for a UE to monitor. Further, maximum number of search space sets configurable for a BWP in a cell for a UE is 10.

Transmission Scheme of PDCCH for Single Carrier Waveform for Above 52.6 GHz Carrier Frequency As mentioned above, in Rel-15 NR, CP-OFDM waveform is applied for the transmission of PDCCHs, and multiple PDCCHs can be multiplexed in a frequency division multiplexing (FDM) manner. However, for system operating above 52.6 GHz carrier frequency, when SC-FDE waveform is applied for the transmission of PDCCH, PDCCHs for same or different UEs may not be multiplexed in a FDM manner. In this case, certain mechanisms on the transmission scheme of PDCCH needs to be defined.

Note that in the embodiments as described below, the terminologies "data block" and "SC-FDE symbol" are exchangeable.

Embodiments of transmission scheme of PDCCH for above 52.6 GHz carrier frequency are provided as follows:

In one embodiment of the disclosure, CORESET is defined in term of the number of data blocks or SC-FDE symbols within a slot in time domain. Further, within the CORESET, demodulation reference signal (DMRS) and PDCCHs can be multiplexed in a time division multiplexing (TDM) manner.

In one example, minimum CORESET duration may be 2 data blocks or SC-FDE symbols. Further, maximum CORESET duration may be 4 data blocks or SC-FDE symbols.

In one option, the DMRS may be located in the first data block or SC-FDE symbol within the CORESET in order to reduce the latency for PDCCH decoding. In another option, the DMRS may be located in the middle of CORESET, which can help improve the PDCCH decoding performance.

Figure 2:
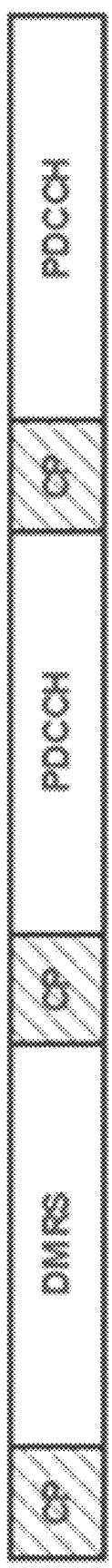
FIG. 2 illustrates an example CORESET configuration for PDCCH with SC-FDE waveform, in accordance with various embodiments.

FIG. 2 illustrates one example of CORESET configuration for PDCCH with SC-FDE waveform. In the example, CORESET spans three data blocks or SC-FDE symbols. Within the CORESET, DMRS is located in the first data block or SC-FDE symbol and the remaining data block or SC-FDE symbols are allocated for PDCCH transmission.

In another embodiment of the disclosure, multiple PDCCHs can be multiplexed in a TDM manner within a CORESET, which may be targeted for same or different UEs or a group of UEs.

Figure 3:
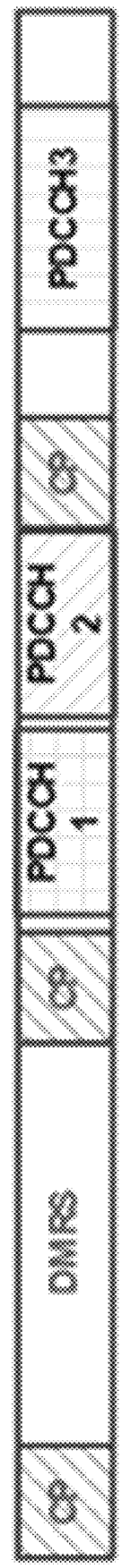
FIG. 3 illustrates one example of TDM based multiplexing of multiple PDCCHs in a CORESET, in accordance with various embodiments.

FIG. 3 illustrates one example of TDM based multiplexing of multiple PDCCHs in a CORESET. Note that depending on the search space design, different PDCCHs may or may not be interleaved in the time domain in a CORESET.

In another embodiment of the disclosure, resource element group (REG) and/or control channel element (CCE) for the transmission of PDCCH can span $N_{REG}$ and $N_{CCE}$ samples within a SC-FDE symbol, respectively. Further, $N_{CCE}=K \cdot N_{REG}$. For example, K=4. Alternatively, K=1. Equivalently, it means only one concept from REG or CCE is used in defining PDCCH mapping structure.

In one example, assuming SC-FDE based waveform with CP, the number of samples for a SC-FDE symbol can be 768, and CP can be 54 samples. In this case, the number of samples for a REG and a CCE can be 12 and 48, respectively. Within a SC-FDE symbol, 16 CCEs can be defined.

In another embodiment of the disclosure, a time first mapping can be applied for CCE-to-REG mapping in time domain within a CORESET for the transmission of PDCCH. For the time first mapping, the CCE index within a CORESET may be countered from the first SC-FDE symbol and then the second SC-FDE symbol for the PDCCH transmission.

Figure 4:
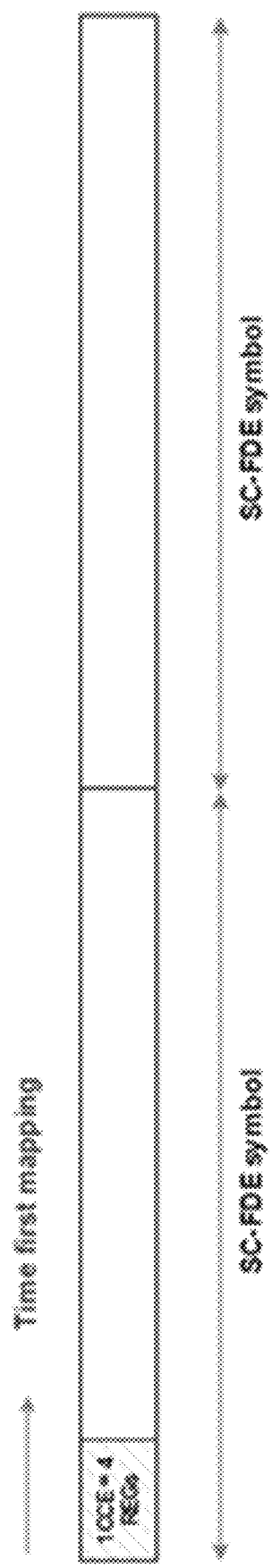
FIG. 4 illustrates one example of CCE-to-REG mapping for SC-FDE waveform, in accordance with various embodiments.

FIG. 4 illustrates one example of CCE-to-REG mapping for SC-FDE waveform. In the example, one CCE has 4 REGs and is defined within one SC-FDE symbol.

Figure 5:
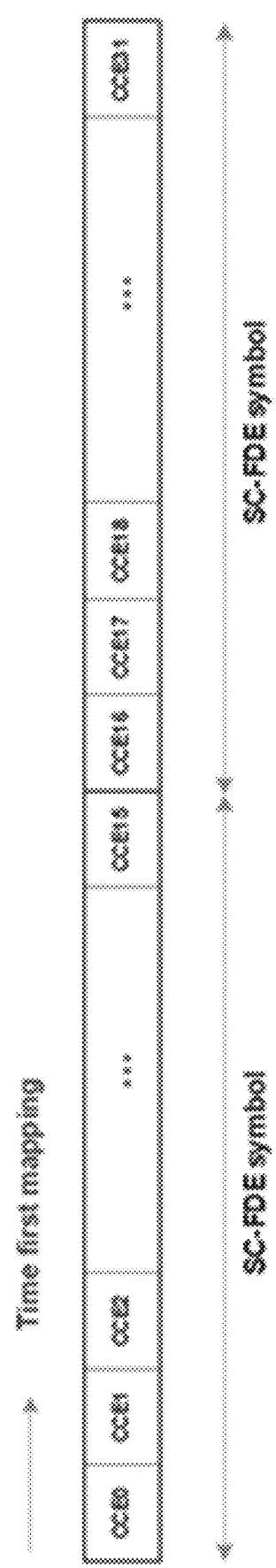
FIG. 5 illustrates one example of CCE mapping for SC-FDE waveform, in accordance with various embodiments.

FIG. 5 illustrates one example of CCE mapping for SC-FDE waveform. In the example, CORESET spans 3 SC-FDE symbols and PDCCH spans 2 SC-FDE symbols. DMRS is located in the first SC-FDE symbol within the CORESET. Based on the time first mapping, CCE index is counted from the first SC-FDE symbol and then the second SC-FDE symbol.

In another embodiment of the disclosure, to further reduce the latency, PDCCH and associated DMRS may be multiplexed in a TDM manner within a SC-FDE symbol.

In one option, first part of the samples in a SC-FDE symbol can be allocated for DMRS and remaining part of the samples in the SC-FDE symbol can be allocated for PDCCH. In one example, the data block or SC-FDE symbol may be evenly split between DMRS and PDCCH. In addition, the CP or GI or UW of the DMRS and PDCCH can be equally split into two parts within a SC-FDE symbol.

Figure 6:
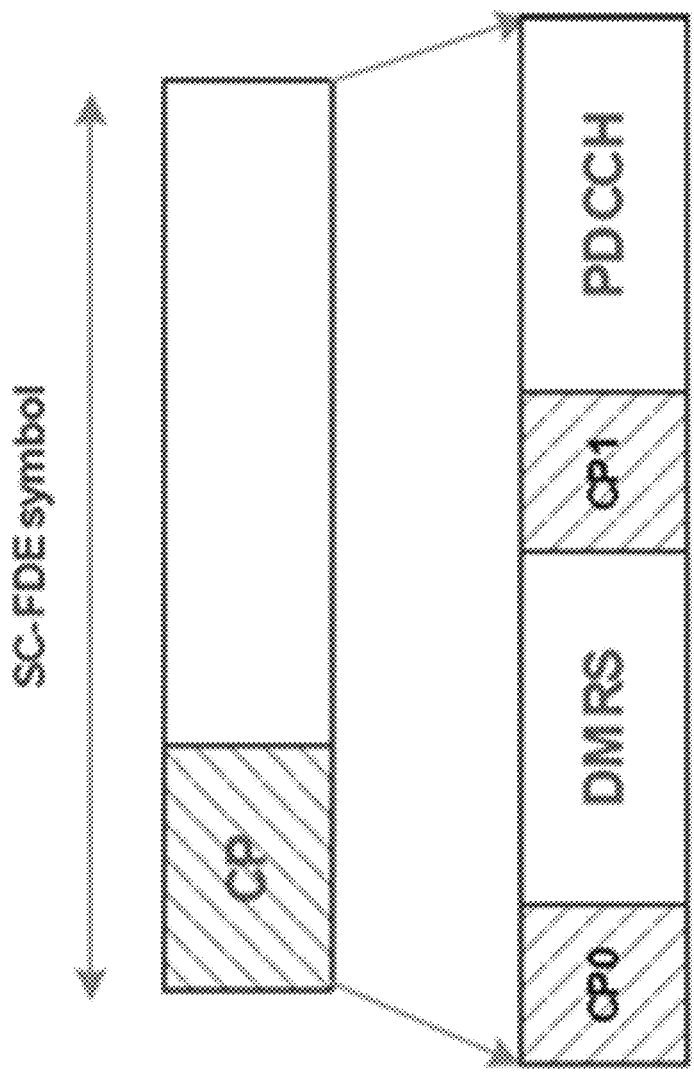
FIG. 6 illustrates one example of multiplexing DMRS and PDCCH in a SC-FDE symbol, in accordance with various embodiments.

FIG. 6 illustrates one example of multiplexing DMRS and PDCCH in a SC-FDE symbol. In the example, SC-FDE waveform with CP is assumed. Further, DMRS and PDCCH are multiplexed in a TDM manner. The length of CP0 and CP1 is half of the length of the CP in SC-FDE symbol.

DMRS Generation for PDCCH with SC-FDE Waveform

For PDCCH transmission with SC-FDE waveform, given that the DMRS and PDCCH are multiplexed in a TDM manner, the number of DMRS antenna ports (AP) may be increased in order to support multiple PDCCHs in a CORESET.

Embodiments of DMRS generation for PDCCH with SC-FDE waveform are provided as follows:

In one embodiment of the disclosure, single DMRS AP is defined for the PDCCH transmission with SC-FDE waveform. Further, in order to support multiple PDCCHs in a CORESET, different initialization seeds or scrambling IDs may be used for the transmission of PDCCHs.

In another embodiment of the disclosure, multiple DMRS APs can be defined for the PDCCH transmission with SC-FDE waveform. Multiple DMRS APs may be multiplexed in a TDM and CDM manner or a combination therefore. The DMRS design for PDSCH as proposed previously can be extended and employed for PDCCH transmission with SC-FDE waveform.

In one option, a default DMRS AP may be predefined in the specification or configured by higher layers via NR minimum system information (MSI) or NR remaining minimum system information (RMSI) if the CORESET is configured by the PBCH or by the controlResourceSetZero field in the PDCCH-ConfigCommon IE.

In another option, for PDCCH with common search space using SC-FDE waveform, the DMRS AP may be configured by higher layers via MSI or RMSI or radio resource control (RRC) signaling.

For PDCCH with UE specific search space using SC-FDE waveform, the DMRS AP may be configured by higher layers via RRC signaling in a UE specific manner.

In another embodiment of the disclosure, for the DMRS sequence generation for PDCCH with SC-FDE waveform, the scrambling ID may be configured by higher layer via MSI or RMSI or RRC signaling. If not configured, a default value of physical cell ID can be used for the scrambling ID for the DMRS sequence generation.

SSB Rate Matching Indication for NR Unlicensed Operation

For 5G system, high frequency band communication has attracted significantly attention from the industry, since it can provide wider bandwidth to support the future integrated communication system. The beam forming is a critical technology for the implementation of high frequency band system due to the fact that the beam forming gain can compensate the severe path loss caused by atmospheric attenuation, improve the SNR, and enlarge the coverage area. By aligning the transmission beam to the target UE, the radiated energy is focused for higher energy efficiency, and the mutual UE interference is suppressed.

For mmWave frequency bands, synchronization signal block (SSB) including primary synchronization signal (PSS), secondary synchronization signal (SSS) and physical broadcast channel (PBCH) are transmitted in multiple time instances, possibly with different transmit beam directions, or spatial filters.

In NR Rel-15, a bitmap which is provided by higher layer parameter ssb-PositionsInBurst in SIB1 and ServingCell-ConfigCommon, is used to indicate the actually transmitted SS Block position in SS block potential position. Note that this information is used to allow UE to perform rate-matching of physical downlink shared channel (PDSCH) which are partially overlapping with SSB resource in time and frequency. When SSB overlaps with a physical downlink control channel (PDCCH) candidate at least one resource element (RE), UE is not required to monitor the PDCCH candidate.

Figure 7:
FIG. 7 illustrates an example discovery reference signal (DRS) transmission of 1 ms including 2 slots, in accordance with various embodiments.

For NR systems operating on unlicensed spectrum, discovery reference signal (DRS) is employed to facilitate fast transition of small cell from OFF state to ON state by transmitting low duty cycle signals. SSB can be a part of DRS and is transmitted to allow UEs to discover and measure the dormant cell. FIG. 7 illustrates one example of DRS transmission duration of 1 ms comprising of 2 slots (using 30 kHz subcarrier spacing (SCS)). In this example, DRS comprises of SSB and optionally RMSI and CSI-RS.

Note that for NR systems operating on unlicensed spectrum, the transmission of physical channels and signals, including SSB is subject to listen before talk (LBT). Even when gNB may indicate the actually transmitted SSB positions via higher layer signalling, however, if the outcome of LBT is not successful, gNB cannot transmit SSB in some positions. This may not be desirable as some of the SSB may not be actually transmitted, however, have to be reserved for PDSCH rate-matching purpose, which would lead to substantial spectrum inefficiency from system perspective. To address this issue, some enhancements on SSB rate-matching need to be considered for NR systems operating on unlicensed spectrum.

Note that similar issue may also arise for system operative above 52.6 GHz carrier frequency with unlicensed spectrum, especially when the number of beams for the transmission of SSB and the number of SSB candidate positions are large. In this regard, certain mechanism on SSB rate-matching indication may need to be considered.

Embodiments herein provide mechanisms on SSB rate-matching indication.

As mentioned above, for NR systems operating on unlicensed spectrum, DRS is employed to facilitate fast transition of small cell from OFF state to ON state by transmitting low duty cycle signals. Further, a DRS transmission window is defined as a 5 ms interval comprising of 10 slots (30 kHz SCS) where each slot comprises of 2 SSB candidate positions. A total of 20 SSB candidate positions can be provided in a DRS transmission window for 30 kHz SCS. Table 1 illustrates the parameters which are used for SSB time index determination.

TABLE 1

Parameters for SSB time index determination

| Parameter | Description | Values |
|---|---|---|
| t or y | Time-index or SSB candidate position within 5 ms (for 30 kHz SCS) | 0, . . . , 19 |

TABLE 1-continued

Parameters for SSB time index determination

| Parameter | Description | Values |
|---|---|---|
| c | Cycle index | 0, 1, 2, 3 |
| s | PBCH-DMRS index | 0, 1, . . . , 7 |
| b | Beam index | 0, 1, . . . , 7 |
| Q | Number of beams used in the cell | 1, 2, 4, 8 |

Based on the above parameters, the time index at the UE is determined from c and s, and is given by: $t = 8 \ast c + s$, where $c = 0, 1, 2$ is the cycle index, and $s = 0, \ldots, 7$ is demodulation reference signal (DMRS) index for PBCH transmission.

Further, beam index at the UE is determined from s and Q and is given by $b = \mod(s, Q)$. This can also be written as: $b = \mod(8 \ast c + s, Q)$, where Q is the number of beams. The beam indices corresponding to each candidate SSB position within a 5 ms DRS transmission window are shown by table 2 for different Q values.

TABLE 2

Beam indices corresponding to each SSB position within a 5 ms DRS window

| c | 0 | 0 | 0 | 0 | 0 | 0 | 0 | 0 | 1 | 1 | 1 | 1 | 1 | 1 | 1 | 1 | 2 | 2 | 2 | 2 |
|---|---|---|---|---|---|---|---|---|---|---|---|---|---|---|---|---|---|---|---|---|
| t | 0 | 1 | 2 | 3 | 4 | 5 | 6 | 7 | 8 | 9 | 10 | 11 | 12 | 13 | 14 | 15 | 16 | 17 | 18 | 19 |
| s | 0 | 1 | 2 | 3 | 4 | 5 | 6 | 7 | 0 | 1 | 2 | 3 | 4 | 5 | 6 | 7 | 0 | 1 | 2 | 3 |
| Q = 8, b | 0 | 1 | 2 | 3 | 4 | 5 | 6 | 7 | 0 | 1 | 2 | 3 | 4 | 5 | 6 | 7 | 0 | 1 | 2 | 3 |
| Q = 4, b | 0 | 1 | 2 | 3 | 0 | 1 | 2 | 3 | 0 | 1 | 2 | 3 | 0 | 1 | 2 | 3 | 0 | 1 | 2 | 3 |
| Q = 2, b | 0 | 1 | 0 | 1 | 0 | 1 | 0 | 1 | 0 | 1 | 0 | 1 | 0 | 1 | 0 | 1 | 0 | 1 | 0 | 1 |
| Q = 1, b | 0 | 0 | 0 | 0 | 0 | 0 | 0 | 0 | 0 | 0 | 0 | 0 | 0 | 0 | 0 | 0 | 0 | 0 | 0 | 0 |

Figure 8:
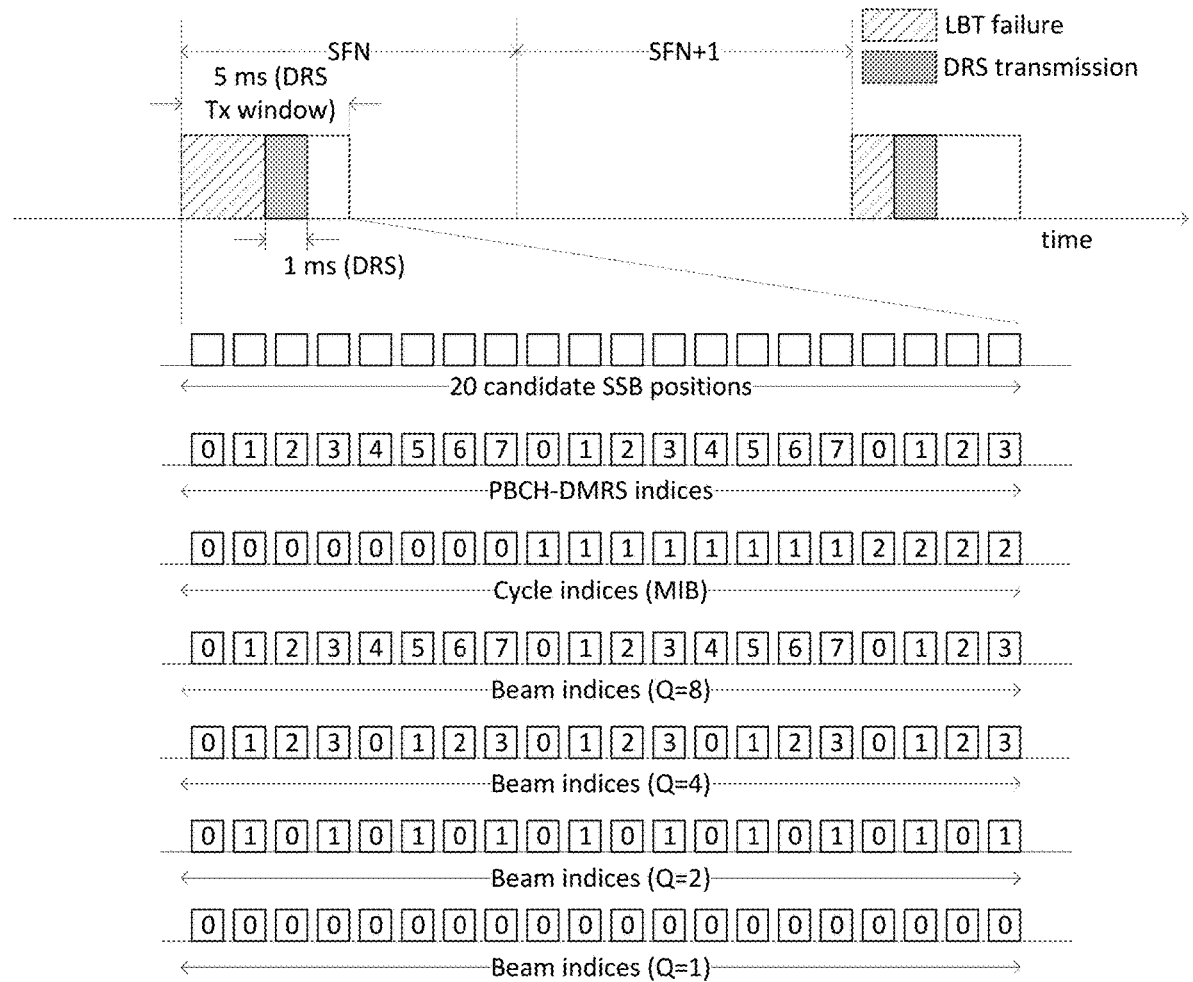
FIG. 8 illustrates beam indices corresponding to each SSB position with different Q values, in accordance with various embodiments.

FIG. 8 illustrates the information in table 2 above for Q=2, 4 and 8. FIG. 8 illustrates beam indices corresponding to each SSB position with different Q values.

SSB Rate-Matching Indication

As mentioned above, for NR systems operating on unlicensed spectrum, the transmission of physical channels and signals, including SSB is subject to listen before talk (LBT). Even when gNB may indicate the actually transmitted SSB positions via higher layer signalling, however, if the outcome of LBT is not successful, gNB cannot transmit SSB in some positions. This may not be desirable as some of the SSBs may not be actually transmitted, however, have to be reserved for PDSCH rate-matching purpose, which would lead to substantial spectrum inefficiency from system perspective. To address this issue, some enhancements on SSB rate-matching need to be considered for NR systems operating on unlicensed spectrum. Embodiments for SSB rate-matching indication are provided as follows.

In one embodiment, a bitmap is used to indicate the actually used beams for SSB transmission, which is used to determine the SSB positions for rate-matching accordingly. Further, as the number of beams used for SSB transmission is less than the number of SSB candidate positions, the bitmap can be repeated across the number of beams within 5 ms DRS windows.

The size of bitmap may be equal to Q or 8. For the latter case, ssb-PositionsInBurst may be reused.

When 8-bit bitmap is defined, e.g., reusing ssb-PositionsInBurst, and when the number of beams, i.e., Q is less than 8, the first Q bits are used to indicate the actually used beam for SSB transmission. Further, the remaining (8-Q) bits may be repeated based on the first Q bits or may be set to "0". In the latter case, UE may ignore the last (8-Q) bits for actually used beams for SSB transmission. The UE may also expect that the last (8-Q) bits are set to 0.

Figure 9:
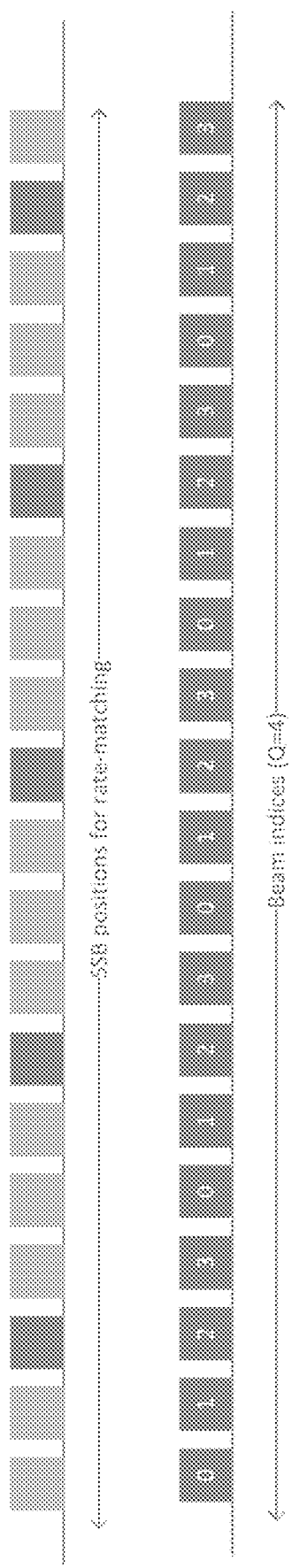
FIG. 9 illustrates an example of SSB positions for rate-matching, in accordance with various embodiments.

In one example, assuming Q=4, the bitmap size is 8, and the bitmap is 11010000, in this case, UE would assume that SSB is transmitted in beam index #0, 1, 3 across 20 SSB candidate positions in 5 ms DRS window. The example of SSB positions for rate-matching is illustrated by FIG. 9. FIG. 9 shows an example of SSB positions assumed by UE for PDSCH rate-matching for below 6 GHz.

In another embodiment, in Rel-15 NR for above 6 GHz carrier frequency, 16-bit indication for actually transmitted SSB positions (ssb-PositionsInBurst) configured in SIB1 is based on compressed signalling, where first 8 bits are used to indicate the presence of SSB block groups (8 groups); and the second 8 bits are used to indicate whether SSB is transmitted in the candidate positions within the SSB block group. Note that for each group, the same bitmap is applied for actually transmitted SSB positions.

For above 52 GHz carrier frequency with unlicensed spectrum, SSB candidate positions may exist in each slot within a DRS window, where the DRS window may be predefined in the specification, e.g., 1 ms or 5 ms, or configured by higher layers via NR minimum system information (MSI), NR remaining minimum system information (RMSI), NR other system information (OSI) or radio resource control (RRC) signalling. Similar to below 6 GHz carrier frequency, the number of beams used for the transmission of SSB can be defined or configured by higher layers via MSI, RMSI, OSI or RRC signalling.

In one option, 16 bit indication, ssb-PositionsInBurst, can be used to indicate the used beam for the transmission of SSBs within a DRS window. Further, first 8 bits are used to indicate the presence of SSB block groups, while the second 8 bits are used to indicate the position of used beams within a SSB group with 8 SSB positions, where the first [Q/8] bits are used to indicate that the used beam in each group and the remaining 8−[Q/8] bits may be set to 0 or repeated version of first [Q/8] bits if Q<=64. Further, the pattern for used beam for 64 SSB candidate positions is repeated within a DRS window. The cycle index can be included in the PBCH payload in order to allow UE to determine the time index, e.g., symbol, slot and frame boundary.

Figure 10:
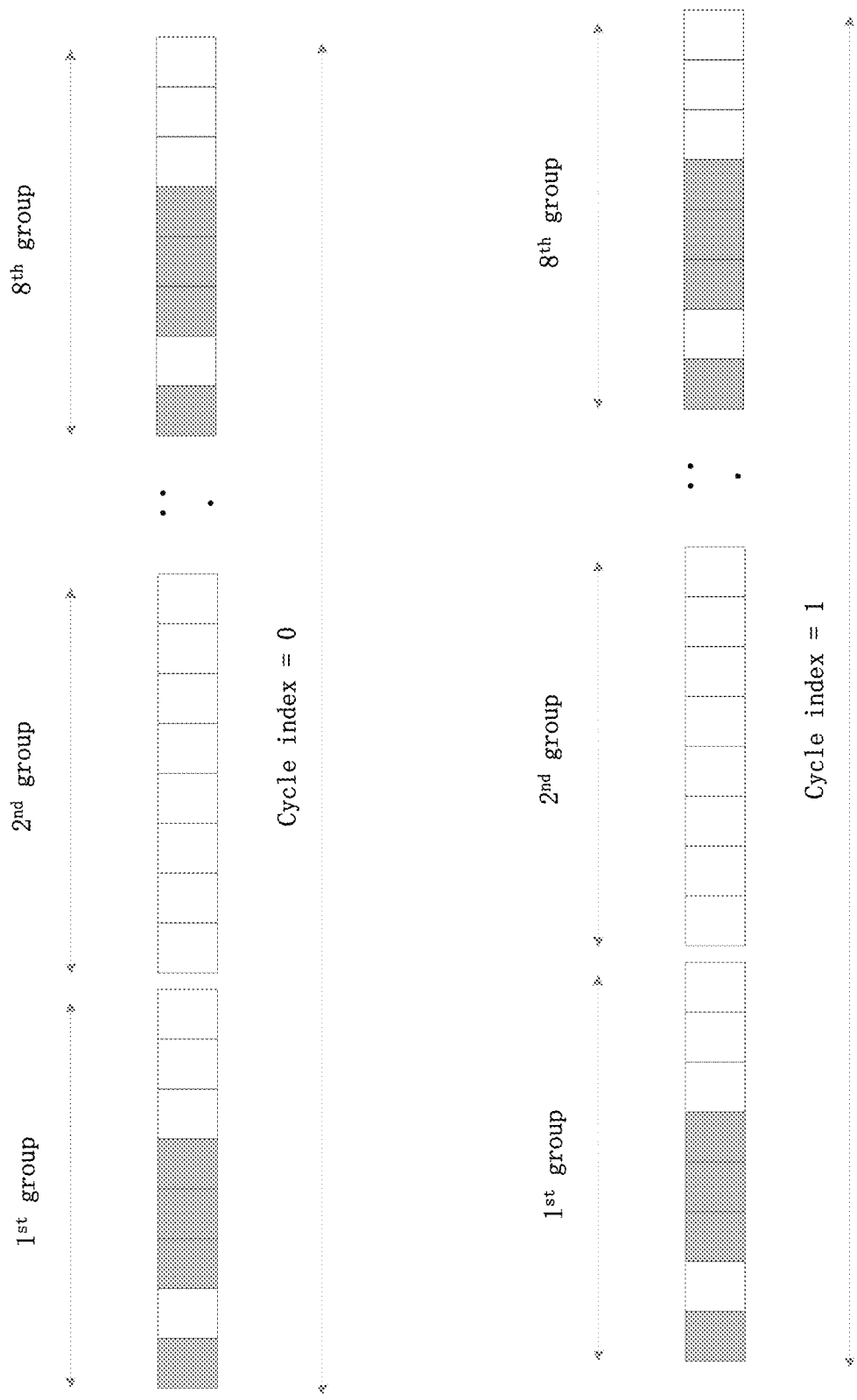
FIG. 10 illustrates an example of SSB positions for rate-matching for about 6 GHz carrier frequency.

FIG. 10 illustrates one example of SSB positions for rate-matching for above 6 GHz carrier frequency. In the example, 960 kHz subcarrier spacing is assumed for above 52.6 GHz with unlicensed spectrum. Further, 1 ms DRS window is assumed, which indicates that the number of SSB candidate positions can be 128 and the cycle index with 1 ms DRS window can be 0 or 1, which is included in the PBCH payload. The number of beams is 40.

In this example, first 8-bit bitmap is 10111111, which indicates that the second group of SSB is not transmitted. In addition, second 8-bit bitmap is 10111000, which indicates that the used beam or the reserved SSB for rate-matching is in 1st, 3rd to 5th position.

In another embodiment, a field, e.g., 1 bit indicator in the DCI format 1_0 and/or 1_1 can be used to indicate whether PDSCH is rate-matched around the SSB in a same slot. In particular, bit "1" may be used to indicate that SSB is actually transmitted in the slot where PDSCH is scheduled, and PDSCH is rate-matched around the SSB when PDSCH overlaps with SSB in time and frequency; while bit "0" may be used to indicate that SSB is not transmitted in the same slot where PDSCH is scheduled, and PDSCH is not rate-matched around the SSB.

Figure 11:
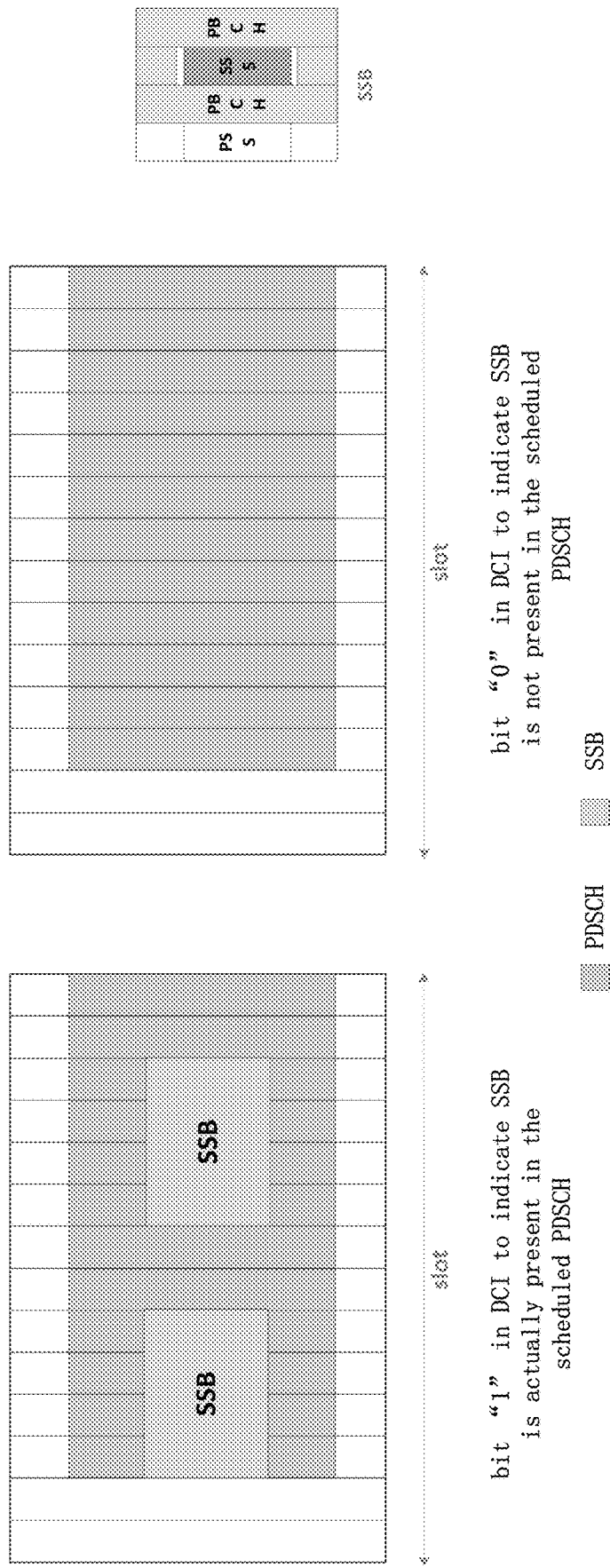
FIG. 11 illustrates an example of dynamic indication of presence of SSB for PDSCH rate-matching with 1 bit indicator.

FIG. 11 illustrates one example of dynamic indication of presence of SSB for PDSCH rate-matching with 1 bit indicator. In the example, bit "1" in DCI indicates SSB is actually present in the scheduled PDSCH where PDSCH needs to be rate-matched around the actually transmitted SSBs. Bit "0" in DCI indicates SSB is not present in the scheduled PDSCH and PDSCH does not need to be rate-matched around the SSBs.

As a further extension, 2 bit indicator may be used to indicate whether PDSCH is rate-matched around the SSB in a same slot, where first and second bit are used to indicate whether PDSCH is rate-matched around the 1st and 2nd SSB in the same slot, respectively.

Figure 12:
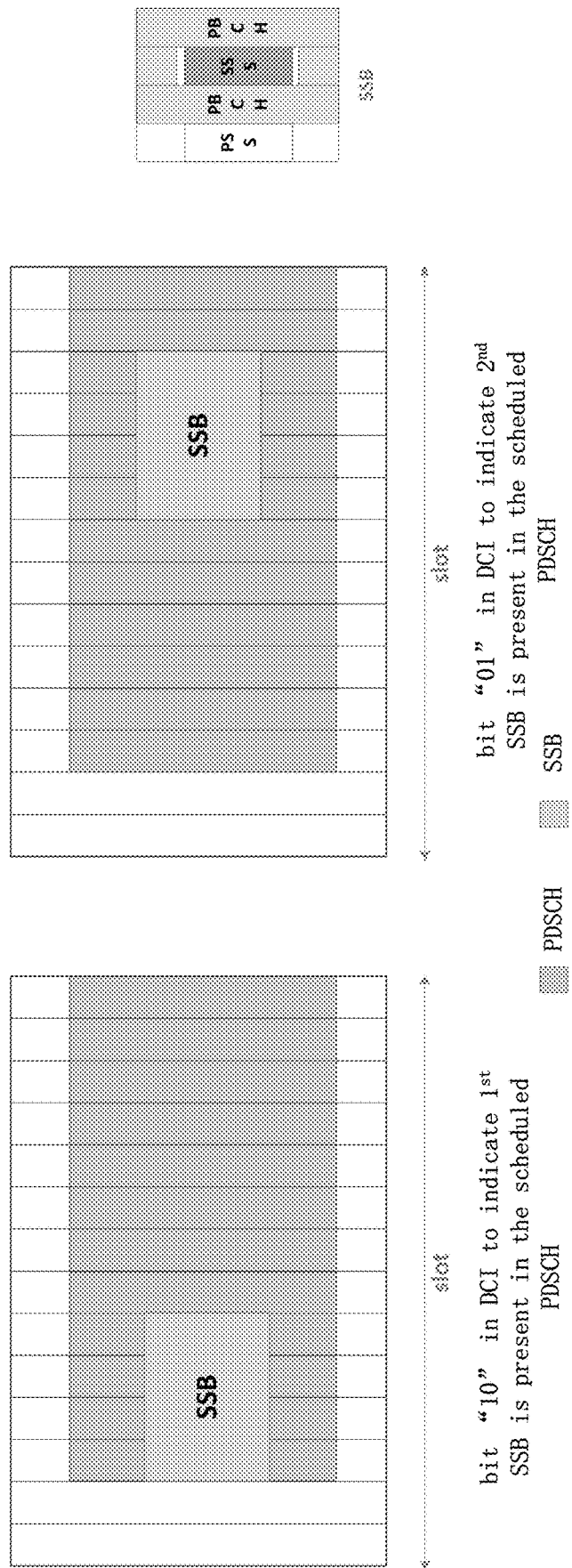
FIG. 12 illustrates an example of dynamic indication of presence of SSB for PDSCH rate-matching with 2 bit indicator.

FIG. 12 illustrates one example of dynamic indication of presence of SSB for PDSCH rate-matching with 2 bit indicator. In the example, bit "10" in DCI indicates 1st SSB is actually present in the scheduled PDSCH where PDSCH needs to be rate-matched around the actually transmitted 1st SSB, but not 2nd SSB. Bit "01" in DCI indicates 2nd SSB is present in the scheduled PDSCH where PDSCH needs to be rate-matched around the actually transmitted 2nd SSB, but not 1st SSB.

In this case, even if ssb-PositionsInBurst, which is semi-statically configured by higher layers, it can be overridden by dynamic scheduling. This is beneficial in terms of spectrum efficiency improvement, especially when considering that gNB fails the LBT and cannot transmit the SSB on the position which is indicated as actually transmitted.

In another embodiment, to allow dynamic indication of the rate-marching resource for SSB, rate-matching resource can be configured referring to one or two SSB positions in time and frequency resource within a slot. Further, similar to Rel-15 NR, an indicator in the DCI format 1_1 can be used to indicate whether configured SSB time/frequency resource(s) is valid or not for a certain dynamically scheduled PDSCH transmission for rate-matching.

For DCI format 1_0 scheduling PDSCH, UE assume the actually transmitted SSB position is based on the high layer parameter ssb-PositionsInBurst.

In another embodiment, in Rel-15, for unpaired spectrum, in case when UL transmission, including physical uplink shared channel (PUSCH), physical uplink control channel (PUCCH), physical random access channel (PRACH), overlaps with actually transmitted SSB at least in one symbol, UE would not transmit these UL channels. Further, when sounding reference signal (SRS) overlaps with actually transmitted SSB in time, UE would not transmit the SRS in the overlapped symbols.

For NR system operating in unlicensed system, one field in the DCI format 1_0 and/or 1_1 for scheduling PDSCH can be used to indicate whether SSB is not transmitted when overlapping with PUCCH carrying HARQ-ACK feedback. In particular, bit "1" may be used to indicate that SSB is actually transmitted when overlapping with the PUCCH in time. In this case, PUCCH carrying HARQ-ACK is not transmitted. Further, bit "0" may be used to indicate that SSB is not transmitted when overlapping with the PUCCH in time. In this case, PUCCH carrying HARQ-ACK is transmitted.

Similarly, one field in the DCI format 0_0 and/or 0_1 for scheduling PUSCH can be used to indicate whether SSB is not transmitted when overlapping with the scheduled PUSCH. In particular, bit "1" may be used to indicate that SSB is actually transmitted when overlapping with the PUSCH in time. In this case, PUSCH is not transmitted. Further, bit "0" may be used to indicate that SSB is not transmitted when overlapping with the PUSCH in time. In this case, PUSCH is transmitted.

In another embodiment, a group common physical downlink control channel (PDCCH) may be used to carry a bitmap on whether the corresponding SSB is actually transmitted for PDSCH rate-matching. The order of each bit in the bitmap may indicate the SSB candidate position in DRS window, e.g., 1 ms or 5 ms, or in the number of beams, or in the SSB group. More specifically, bit "1" in the bitmap may be used to indicate that the corresponding SSB is actually transmitted and PDSCH needs to be rate-matched around the SSB or UL transmission is dropped when overlapping with the SSB. Bit "0" in the bitmap may be used to indicate that the corresponding SSB is not transmitted and PDSCH does need to be rate-matched around the SSB and UL signals/channels.

This bitmap may be carried by DCI format 2_0 or DCI format 2_1 or a dedicated group common PDCCH.

Beam Acquisition for Frequency Division Duplex (FDD) Systems

For 5G systems, high frequency band communication has attracted significant attention from the industry, since it can provide wider bandwidth to support the future integrated communication system. The beam forming is a critical technology for the implementation of high frequency band system due to the fact that the beam forming gain can compensate the severe path loss caused by atmospheric attenuation, improve the SNR, and enlarge the coverage area. By aligning the transmission beam to the target user equipment (UE), the radiated energy is focused for higher energy efficiency, and the mutual UE interference is suppressed.

For mmWave frequency bands, synchronization signal block including primary synchronization signal (PSS), secondary synchronization signal (SSS) and physical broadcast channel (PBCH) are transmitted in multiple time instances, possibly with different transmit beam directions, or spatial filters. During initial access, UE would perform Rx beam selection based on SSB measurement and identify an optimal Rx beam.

Based on the assumption of beam correspondence, where Tx and Rx beam can be aligned, UE would transmit a physical random access channel (PRACH) using the determined Rx beam (or Tx beam due to beam correspondence) on a resource which is associated with the detected SSB index according to an association rule between SSB and RACH occasion (RO). After successful detection of PRACH, gNB can determine the optimal Tx beam for downlink transmission. In this regard, a beam pair link is established between gNB and UE for proper operation at high band.

For carrier frequency above 52.6 GHz, system can be operated in frequency division duplex (FDD) manner in certain countries. For instance, in Canada, the frequency ranges 71.125 to 74.375 GHz and 81.125 to 84.375 GHz provide for thirteen pairs of 250 MHz channels (A1/A1' to A13/A13') for systems employing FDD.

Note that for FDD system, beam correspondence may not be assumed at gNB and UE side. In other words, Tx and Rx beam may not be aligned, which may complicate the beam management procedure, especially for beam acquisition or initial beam pair link establishment. For instance, for proper operation, best Tx beam is typically identified by the receiver and this information needs to be known at transmitter side. To address this issue, certain mechanisms on initial beam pair link establishment may need to be enhanced for system operating above 52.6 GHz with FDD deployment. Accordingly, the embodiments of the present disclosure may be directed to, among other things, beam acquisition for FDD system for systems operating above 52.6 GHz.

Beam Acquisition for FDD Systems Operating Above 52.6 GHz

As mentioned above, for carrier frequencies above 52.6 GHz, a system can be operated in frequency division duplex (FDD) manner in certain countries. For instance, in Canada, the frequency ranges 71.125 to 74.375 GHz and 81.125 to 84.375 GHz provide for thirteen pairs of 250 MHz channels (A1/A1' to A13/A13') for systems employing FDD.

Note that for FDD system, beam correspondence may not be assumed at the gNB and UE side. In other words, Tx and Rx beams may not be aligned, which may complicate the beam management procedure, especially for beam acquisition or initial beam pair link establishment. For instance, for proper operation, best Tx beam is typically identified by the receiver and this information needs to be known at transmitter side. To address this issue, certain mechanisms on initial beam pair link establishment may need to be enhanced for system operating above 52.6 GHz with FDD deployment. Some examples of embodiments directed to beam acquisition for FDD system operating above 52.6 GHz are provided below.

In one embodiment, procedure for initial beam pair link establishment for FDD system operating above 52.6 GHz is listed as follows:

Step 1: UE selects best Rx beam based on synchronization signal block (SSB) measurement. Note that it may be up to UE implementation to identify the best Rx beam. For this step, UE can determine the best gNB Tx beam, which can be applied for subsequent DL control and data transmission.

Step 2: UE performs beam sweeping for physical random access channel (PRACH) and/or physical uplink shared channel (PUSCH).

In case when 2-step random access (RACH) procedure is employed, the first message (MsgA) may include both PRACH and PUSCH transmission. Further, SSB index which corresponds to the best gNB Tx beam and is identified by UE in the Step 1, is carried by the PUSCH to inform the best gNB Tx beam for subsequent DL transmission.

In this step, gNB identifies the best gNB Rx beam based on the detected PRACH and/or PUSCH resource.

Step 3: gNB transmits the MsgB for 2-step RACH procedure or Msg2 for 4-step RACH procedure based on the determined Tx beam from Step 2. Further, PRACH and/or PUSCH resource index, which corresponds to the best UE Tx beam and is identified in the Step 2, can be included.

After successful decoding of MsgB or Msg2, UE can determine the best UE Tx beam for subsequent UL transmission, e.g., for Msg3 transmission in 4-step RACH procedure.

Figure 13:
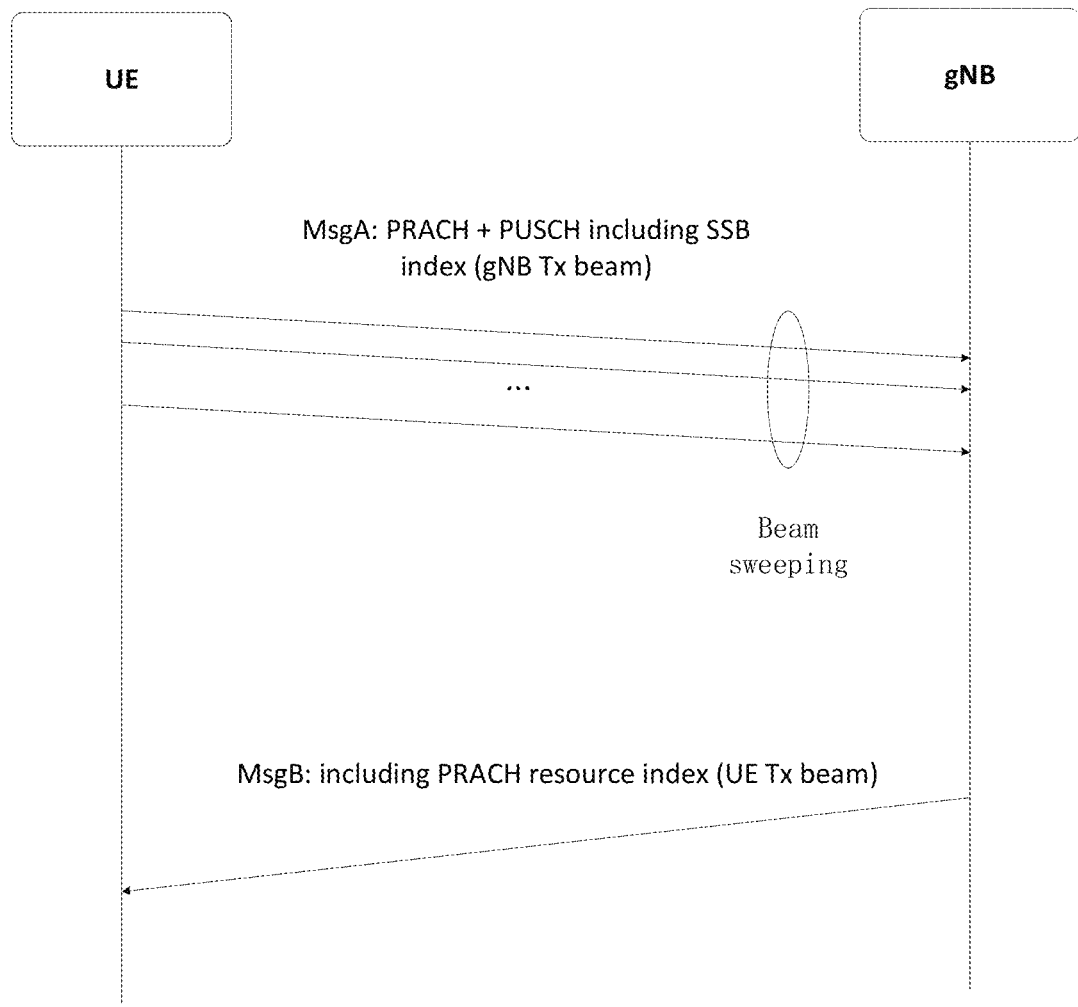
FIG. 13 illustrates a beam acquisition procedure for an FDD system based on 2-step RACH, in accordance with various embodiments.

FIG. 13 illustrates beam acquisition procedure for FDD system based on 2-step RACH. In the figure, Step 2 includes beam sweeping for MsgA PRACH and PUSCH transmission. In addition, the best gNB Tx beam is carried in medium access layer-control element (MAC-CE) in the MsgA PUSCH. Further, Step 3 includes MsgB transmission from gNB, which carries the best UE Tx beam.

In another embodiment, in Step 2 of the aforementioned beam acquisition procedure for FDD system, SSB index which corresponds to the best gNB Tx beam and is identified by UE in the Step 1, may be implicitly carried by PRACH transmission. Further, the SSB index may be indicated by PRACH preamble index and/or RACH occasion index and a combination thereof.

In one option, PRACH preambles may be grouped into multiple PRACH preamble sets. Further, in each PRACH preamble set, preamble index is used to carry the information regarding SSB index.

Assuming N preambles are allocated within a PRACH preamble set, the PRACH preamble index within the PRACH preamble set may be used to indicate $\lceil \log_2 (N) \rceil$ bit SSB index. Note that for contention based RACH procedure, UE randomly selects one PRACH preamble set and determines the PRACH preamble index from the PRACH preamble set in accordance with the SSB index for PRACH transmission. During beam sweeping, same preamble index is applied.

The PRACH preambles in a PRACH preamble set could be allocated in same RACH occasion, or in multiple RACH occasions. For a UE willing to sweep Y beams for the PRACH preamble transmission, UE could perform transmission on Y PRACH preamble sets which are not overlapped in time. UE could select Y RACH occasions which are consecutive in time. Alternatively, UE could randomly select Y RACH occasions within a period of time.

In another option, similar to NR Rel-15, association between SSB and RACH occasion can be defined. In this case, UE performs beam sweeping for PRACH preamble transmission in RACH occasions which are associated with the detected SSB index in the Step 1, in accordance with association between SSB and PRACH occasion. For a UE which is intended to sweep Y beams for the PRACH preamble transmissions, the UE could perform transmission on Y RACH occasions, which are associated with the detected SSB index in the Step 1, in accordance with association between SSB and PRACH occasion. UE could select Y RACH occasions which are consecutive in time. Alternatively, UE could randomly select Y RACH occasions within a period of time. During beam sweeping, same preamble index is applied. Alternatively, during beam sweeping, a random preamble index is respectively selected for each beam.

After the gNB successfully detects PRACH preamble, gNB can determine the SSB index and correspondingly, the best gNB Tx beam based on association between SSB and PRACH occasion.

Figure 14:
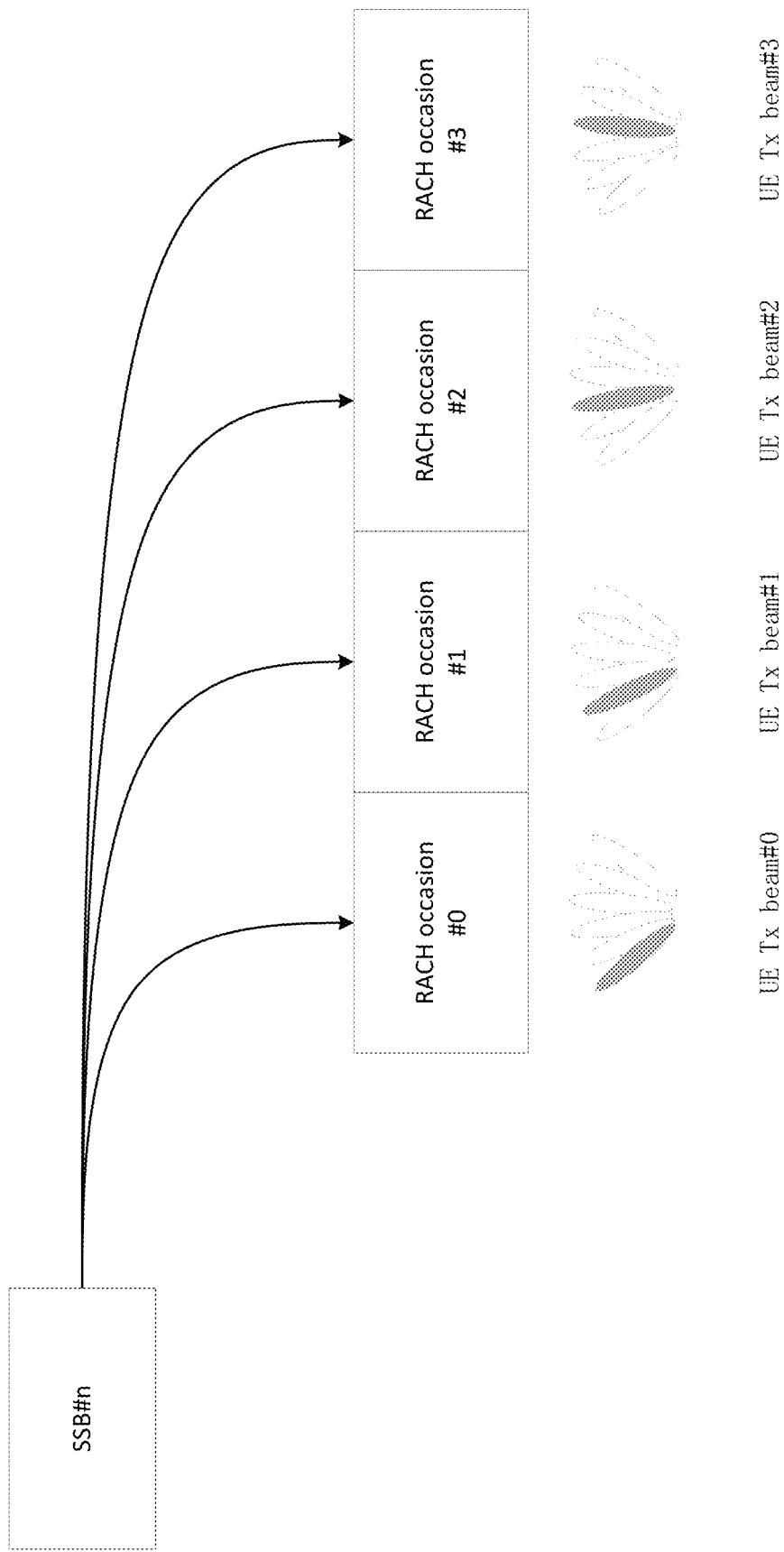
FIG. 14 illustrates beam sweeping for PRACH transmission based on an association between SSB and RACH occasion, in accordance with various embodiments.

FIG. 14 illustrates beam sweeping for PRACH transmission based on association between SSB and RACH occasion. In the example, SSB with index n is associated with 4 RACH occasions. UE performs beam sweeping on PRACH transmission in the corresponding PRACH occasions, which are associated with SSB #n.

Since a UE transmits Y PRACH preambles for beam sweeping, it is possible that gNB may detect multiple PRACH preambles from a same UE. On the other hand, even in case gNB detects two PRACH preambles with same PRACH preamble index in two RACH occasions, it is still possible the two PRACH preambles are from different UEs. Therefore, a gNB could transmit RAR for each detected preamble. At UE side, if a UE receives multiple RARs potentially in responses to its transmitted preambles, an information in RAR can help UE to select a better UE TX beam. For example, the information could be received energy, RSRP or CSI of the associated preamble of the RAR.

In another embodiment, in Step 2 of the aforementioned beam acquisition procedure for FDD system, the SSB index may be jointly carried by MsgA PUSCH for 2-step RACH and implicitly indicated by PRACH transmission. In particular, partial SSB index may be carried by the MsgA PUSCH transmission and the remaining SSB index may be implicitly indicated by PRACH transmission.

In another embodiment, when 2-step RACH is applied for beam acquisition for FDD system, same Tx beam is applied for MsgA PRACH and PUSCH transmission.

In one option, PRACH and PUSCH for a single MsgA transmission are transmitted consecutively in time domain during beam sweeping. Note that there could be a gap between PRACH and PUSCH transmission in MsgA. FIG. 15 illustrates one example of beam sweeping based MsgA transmission with consecutive PRACH and PUSCH in one MsgA transmission. Note that for one MsgA transmission, same UE Tx beam is employed for both RPACH and PUSCH transmission.

In another option, PRACH and PUSCH in one MsgA are transmitted separately in time domain during beam sweeping. Further, multiple PRACHs may be transmitted first via beam sweeping and followed by multiple PUSCH transmissions with beam sweeping. Note that during the beam sweeping, same Tx beam is applied for PRACH and PUSCH in one MsgA transmission. FIG. 16 illustrates one example of beam sweeping based MsgA transmission with separate PRACH and PUSCH.

In another embodiment, the number of beams or PRACH and/or PUSCH repetition may be configured by higher layers via NR minimum system information (MSI), NR remaining minimum system information (RMSI), NR other system information (OSI) or radio resource control (RRC) signalling.

As a further extension, depending on UE specific implementation, the number of beams for beam sweeping in Step 2 may be different for different UEs. In this case, multiple number of beams or PRACH and/or PUSCH repetitions may be configured by higher layers. Note that the starting position (symbol index or slot index) for each number of beams or repetitions may be configured independently.

To indicate the number of beams or PRACH and/or PUSCH repetitions, PRACH resource grouping or different PRACH occasions in time or frequency domain may be used. For instance, repetition levels of PRACH and/or PUSCH transmission may be configured as $L_0$ and $L_1$. Further, preamble index #0-15 may be used to indicate that the repetition level of PRACH and/or PUSCH transmission as $L_0$ while preamble index #16-31 may be used to indicate that the repetition level of PRACH and/or PUSCH transmission as $L_1$.

In another embodiment, in Step 3 of the aforementioned beam acquisition procedure for FDD system, the Tx beam for the transmission of MsgB for 2-step RACH procedure or Msg2 for 4-step RACH is either based on the detected SSB index carried by PUSCH or the SSB that UE used for PRACH association.

In particular, if a UE detects a DCI format 1_0 with the CRC scrambled by the corresponding RA-RNTI or MsgB-RNTI and receives the corresponding PDSCH that includes the DL-SCH transport block, the UE may assume the same DM-RS antenna port quasi co-location properties (QCL) for the detected SSB index or a SSB the UE used for PRACH association.

In another embodiment, in Step 3 of the aforementioned beam acquisition procedure for FDD system, PRACH and/or PUSCH resource index, which corresponds to the best UE Tx beam and is identified in the Step 2, can be included in MsgB for 2-step RACH procedure or Msg2 for 4-step RACH.

The PRACH and/or PUSCH resource index may be defined as the PRACH and/or PUSCH resource index in time domain. For instance, the starting symbol, slot index and/or frame index of PRACH preamble and/or PUSCH transmission within the configured PRACH or PUSCH periodicity can be used to determine PRACH and/or PUSCH resource index for UE Tx beam indication.

In another embodiment, whether to include SSB index in MsgA/Msg1 and detected PRACH and/or PUSCH resource index in MsgB/Msg2 may depend on the frequency gap between DL and UL band. Depending on the frequency gap being above or below a pre-defined threshold, gNB may indicate to the UE via a 1-bit indication in SIB1 whether UE needs to send the detected SSB index information in Msg1/MsgA. For example, if the frequency gap is below the threshold, beam correspondence may be preserved between gNB and UE, in which case UE doesn't need to send the detected SSB index explicitly in MsgA/Msg1. Further, in this case, UE may also assume that gNB will not send the detected PRACH/PUSCH resource index information in Msg2/MsgB.

SSB Patterns and Multiplexing for Downlink Transmissions

Figure 17:
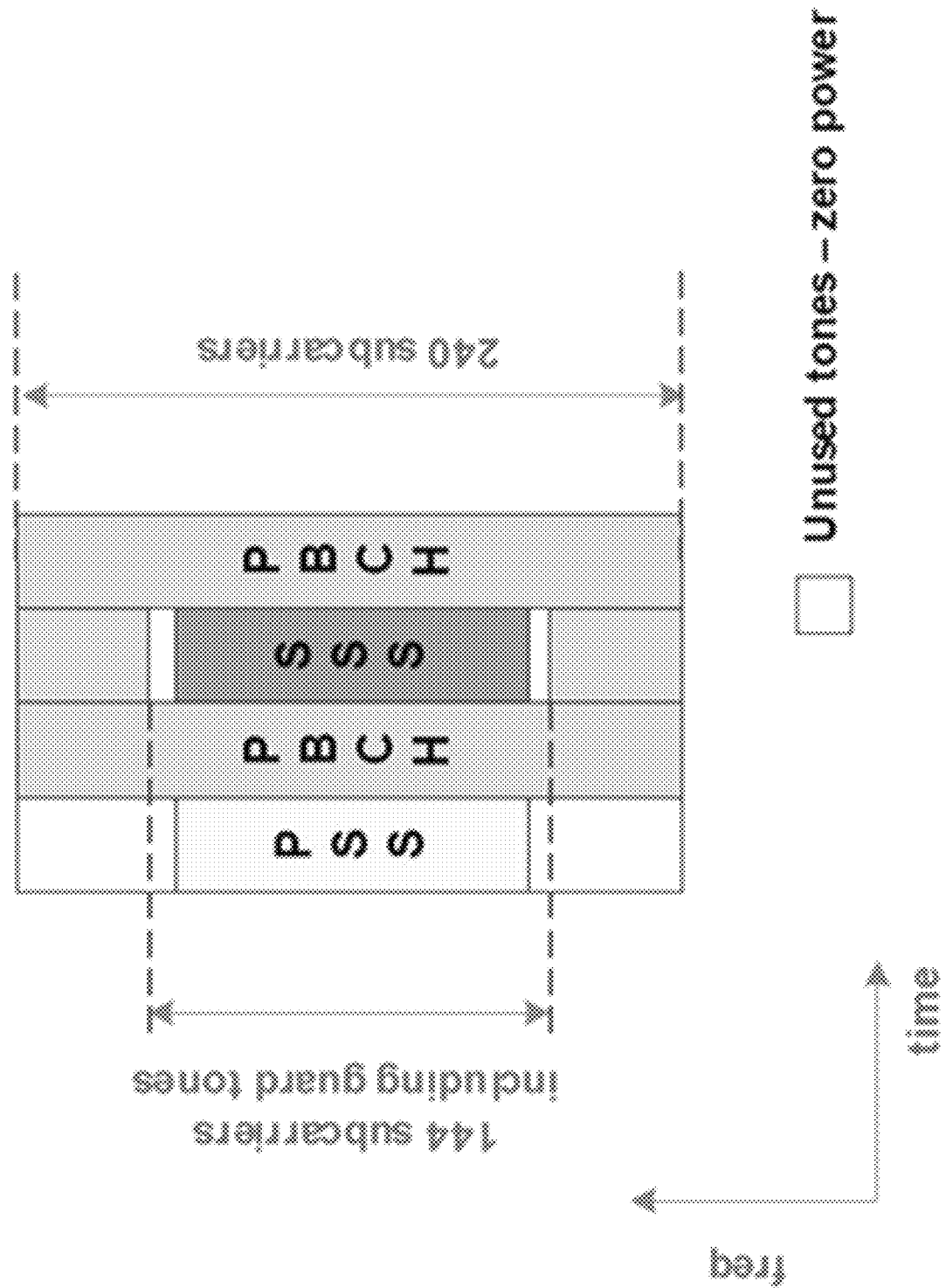
FIG. 17 illustrates an SSB structure in New Radio Release 15.

In NR, a synchronization signal block (SSB) consists of primary synchronization signal (PSS), secondary synchronization signal (SSS), physical broadcast signal (PBCH). As shown in FIG. 17, SSB spans 4 symbols and occupies 240 subcarriers (20 physical resource blocks (PRB)) within one slot and SSB symbol order follows PSS, PBCH, SSS and PBCH. Further, PSS and SSS span 1 orthogonal frequency-division multiplexing (OFDM) symbol and occupies 12 PRBs. PSS is defined based on length-127 BPSK modulated M-sequence, which is used to provide OFDM symbol timing estimate, coarse frequency offset estimate and partial cell ID information. SSS has 1008 sequences and is defined based on length-127 BPSK modulated and XOR of two M-sequence, which is used to provide cell identity.

Note that PBCH occupies 20 PRBs in frequency in non-SSS OFDM symbols within one SSB. In SSS OFDM symbol, additional 8 PRBs are used for PBCH transmission. In particular, PBCH is used to provide timing information including OFDM symbol index, slot index in a radio frame and radio frame number from an SSB. In addition, it is used to carry part of Minimum System Information (MSI), and control configuration information for scheduling remaining MSI (RMSI).

In NR Release 15, system design is targeted for carrier frequencies up to 52.6 GHz with a waveform choice of cyclic prefix—orthogonal frequency-division multiplexing (CP-OFDM) for DL and UL, and additionally, Discrete Fourier Transform-spread-OFDM (DFT-s-OFDM) for UL. However, for carrier frequency above 52.6 GHz, it is envisioned that single carrier based waveform is needed in order to handle issues including low power amplifier (PA) efficiency and large phase noise.

For single carrier based waveform, DFT-s-OFDM and single carrier with frequency domain equalizer (SC-FDE) can be considered for both DL and UL. For OFDM based transmission scheme including DFT-s-OFDM, a cyclic prefix (CP) is inserted at the beginning of each block. Typically, the length of CP exceeds the maximum expected delay spread in order to overcome the inter-symbol interference (ISI).

For systems operating above 52.6 GHz carrier frequency, if DFT-s-OFDM waveform is used for the transmission of PBCH, PBCH and other DL channels may not be multiplexed in a frequency division multiplexing (FDM) manner, which may reduce system spectrum efficiency. To address this issue and improve overall spectrum efficiency, certain mechanisms may need to be considered for the transmission of PBCH and other DL channels.

Among other things, embodiments of the present disclosure are directed to SSB patterns and multiplexing schemes for PBCH and other DL channels for system operating above the 52.6 GHz carrier frequency. In particular, some embodiments relate to (1) the multiplexing of PBCH and other DL channels; and (2) SSB patterns.

Multiplexing of PBCH and Other DL Channels

As mentioned above, for systems operating above 52.6 GHz carrier frequency, if DFT-s-OFDM waveform is used for the transmission of PBCH, PBCH and other DL channels may not be multiplexed in a frequency division multiplexing (FDM) manner—which may reduce system spectrum efficiency. Embodiments of the present disclosure may provide for the transmission of PBCH and other DL channels to address this issue and improve overall spectrum efficiency, In one embodiment of the present disclosure, PBCH and other DL physical channels may be multiplexed in a time division multiplexing (TDM) manner prior to Discrete Fourier Transform (DFT) operation. In particular, after the DFT operation and resource mapping, PBCH and other DL channels are transmitted in the same DFT-s-OFDM symbol. Note that the DL physical channels may include at least one of the following: physical downlink shared channel (PDSCH) carrying common control message including NR remaining minimum system information (RMSI), paging, random access response (RAR), PDSCH carrying unicast data, physical downlink control channel (PDCCH), etc.

To enable TDM of PBCH and other DL channels, a same DFT size is applied for the transmission of PBCH and other DL channels. Given that PBCH is the first physical channel that UE needs to be decoded, the DFT size and starting PRB for the transmission of PBCH and other DL channels need to be predefined in the specification. In case of non-standalone deployment scenario, this DFT size and starting PRB may be signalled in the PCell. As an alternative, the starting PRB may be defined as the PRB offset between PSS and/or SSS and PBCH transmission.

Note that the position of PBCH within the DFT size prior to DFT operation should be predefined in the specification. In one option, starting samples and length of PBCH transmission can be predefined in the specification. Alternatively, PBCH may start from the $1^{st}$ sample within the DFT size and the length of PBCH transmission may be predefined in the specification.

In addition, DMRS associated with PBCH transmission and/or SSS may be used for the channel estimation of other DL channels which are transmitted in the same symbols with PBCH. In this case, DMRS associated with PBCH transmission and/or SSS may occupy the full DFT size within the system bandwidth. In this case, QCL assumption for the transmission of PBCH and other DL channels may assume to be the same.

For this option, typically the transmission bandwidth of PBCH and associated DMRS and/or SSS may be larger than that of PSS. In case when PSS occupies less number of PRBs compared to PBCH and associated DMRS and/or SSS, the remaining REs in the PSS and/or SSS symbols are not used so that power boosting can be applied for the transmission of PSS.

Figure 18:
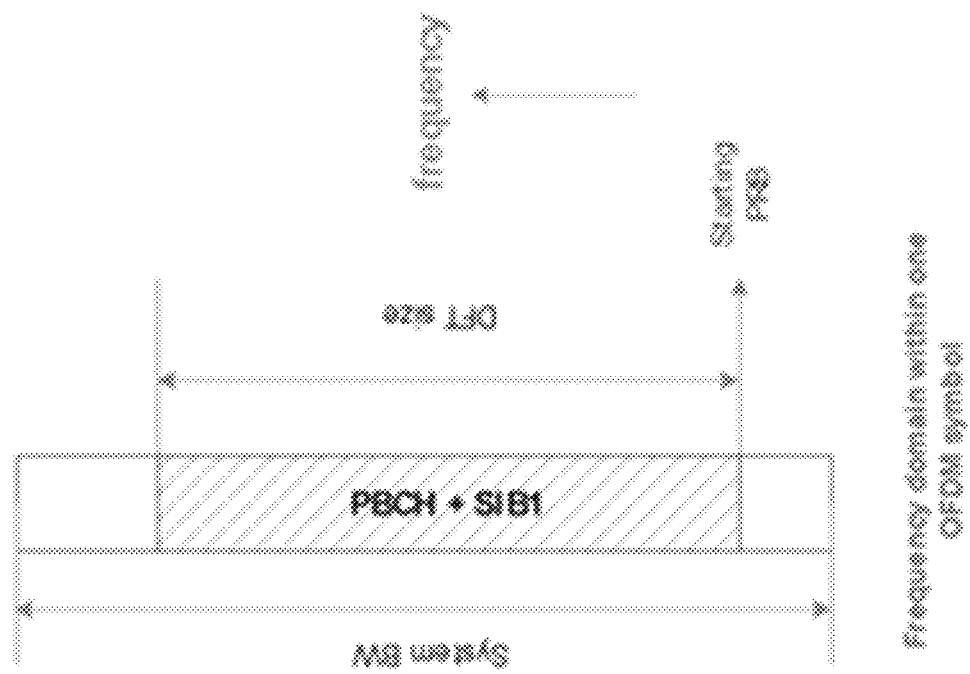
FIG. 18 illustrates an example of multiplexing of PBCH and system information block (SIB1) in a TDM manner prior to DFT operation within one symbol, in accordance with various embodiments.
Figure 18:
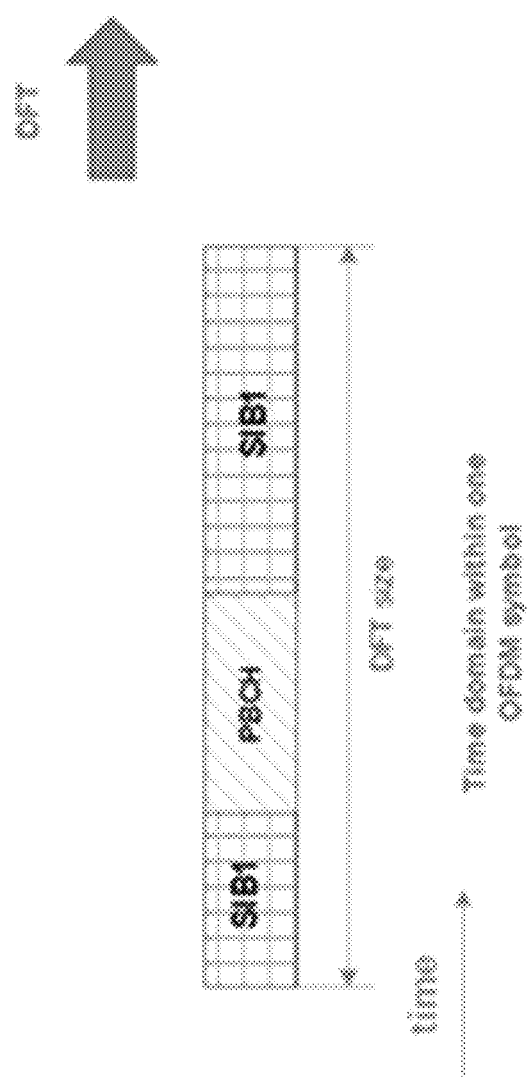

FIG. 18 illustrates one example of multiplexing of PBCH and system information block (SIB1) in a TDM manner prior to DFT operation within one symbol. In the example, PBCH and SIB1 are multiplexed in a TDM manner before DFT operation within the symbols where PBCH are transmitted. Further, in order to allow UE to decode PBCH, the position of PBCH within the DFT size is predefined in the specification. The remaining resource within the DFT size can be allocated for SIB1 transmission. Note that same DMRS can be used for the channel estimation of both PBCH and SIB1 and the length of DMRS is same as DFT size.

In another embodiment of the disclosure, PBCH and other DL physical channels and/or signals may be multiplexed in a time division multiplexing (TDM) manner in a slot and across slot. In other words, PBCH and other DL physical channels and/or signals may be transmitted in different symbols within a slot.

Further, to save overhead for DMRS transmission, SSS and/or DMRS associated with PBCH transmission may be used for the channel estimation of other DL physical channels, e.g., PDCCH for scheduling common control messages or PDSCH containing SIB1, paging message, RAR, etc. To allow UE to perform channel estimation for other DL physical channels, QCL assumption between the transmission of PBCH and other DL physical channels can be assumed. In addition, resource allocated for PBCH and other DL physical channels is the same in frequency domain. In one option, they occupy the full initial DL bandwidth part (BWP).

Figure 19:
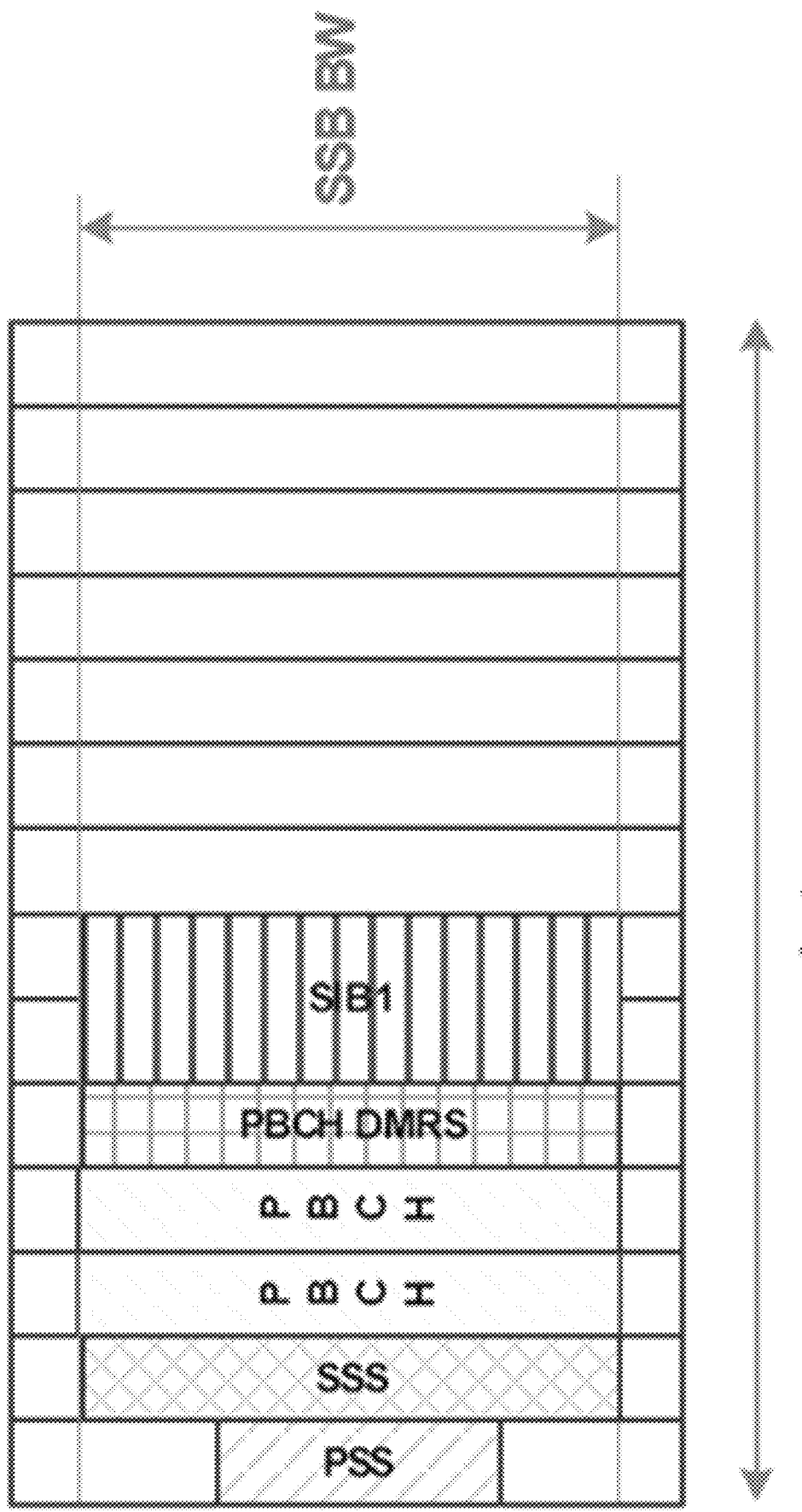
FIG. 19 illustrates one example of multiplexing of PBCH and other DL channels in TDM manner in a slot, in accordance with various embodiments.

FIG. 19 illustrates one example of multiplexing of PBCH and other DL channels in TDM manner in a slot. In the figure, PBCH DMRS is transmitted after PBCH. SSS and DMRS occupy the same bandwidth as PBCH so as to allow channel estimation for PBCH. Note that other permutations of PSS/SSS/PBCH and associated DMRS in different symbols within a slot can be straightforwardly extended from the example below. In the figures, it is assumed that PDSCH carrying SIB1 is multiplexed in a TDM manner with PBCH. In addition, DMRS associated with PBCH is also used for channel estimation of PDSCH carrying SIB1, so as to reduce DMRS overhead.

Figure 20:
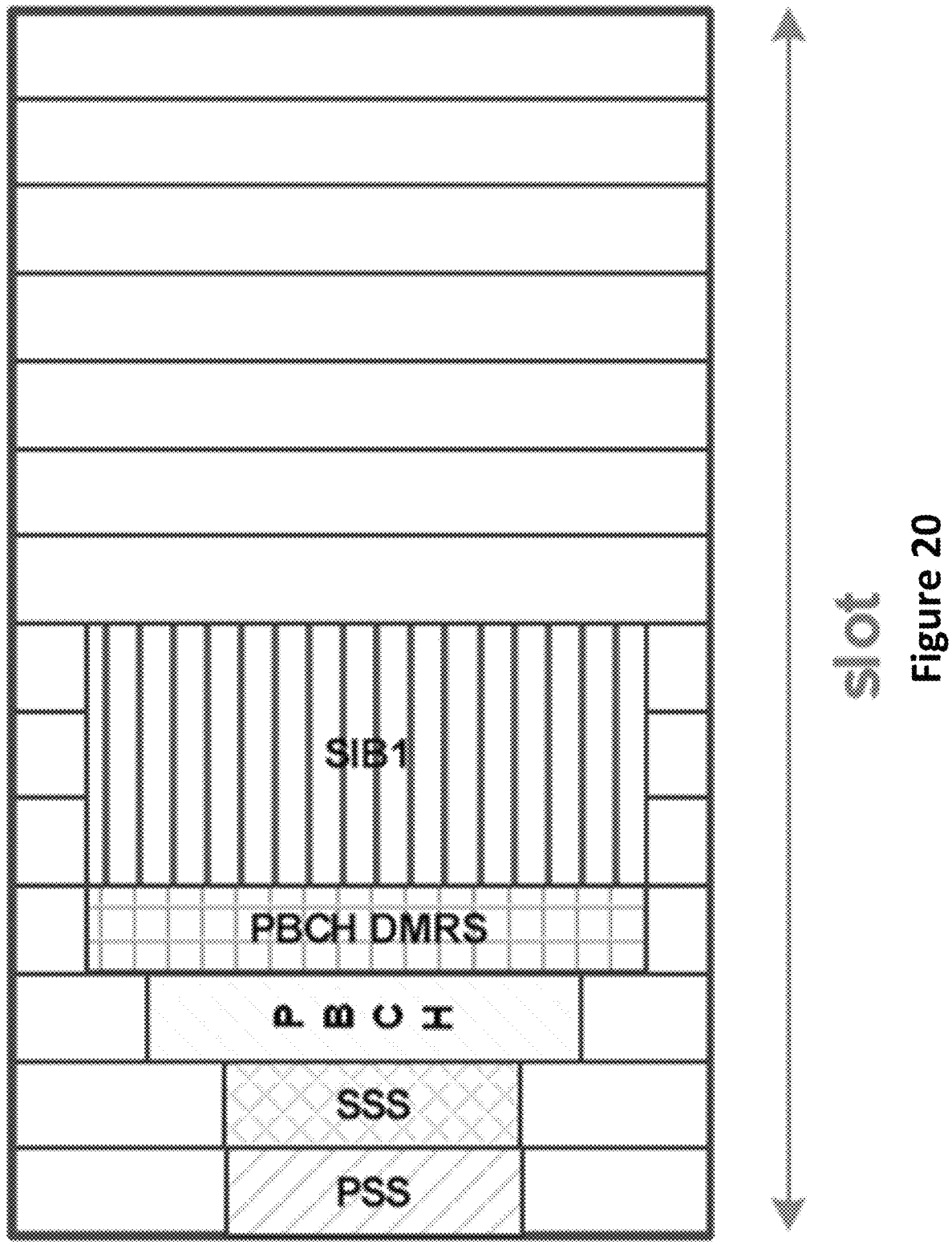
FIG. 20 illustrates another example of multiplexing of PBCH and other DL channels in TDM manner in a slot, in accordance with various embodiments.

FIG. 20 illustrates another example of multiplexing of PBCH and other DL channels in TDM manner in a slot, with different bandwidth occupied by PBCH and PSS/SSS. In the figure, PSS and SSS occupy the same BW. One symbol is used for PBCH transmission. PBCH DMRS occupies a greater number of PRBs than PBCH. Further, PBCH DMRS is also used for the channel estimation of SIB1 transmission. Note that although it is not shown in the figure, PDCCH for scheduling SIB1 may also be transmitted after PBCH DMRS, which may be multiplexed in a TDM manner with PDSCH carrying SIB1 prior to DFT operation.

In another embodiment of the disclosure, SSS or PBCH and other DL physical channels and/or signals may be multiplexed in a spatial division multiplexing (SDM) manner. This is for the case when gNB is equipped with multiple panels so that different panels may be used for the transmission of different DL physical channels/signals simultaneously.

Given that SSB or PBCH and other DL physical channels and/or signals may be transmitted in the same resource, PDSCH may not need to be rate-matched around the SSB and/or PBCH transmission. In one option, ssb-PositionsInBurst in SIB1 and ServingCellConfigCommon, which is used to indicate actually transmitted SS Block position in SS block potential position, may not be needed. Yet in another option, ssb-PositionsInBurst may be fixed to all zero to indicate that PDSCH can be transmitted in SSB positions. Similarly, when PDCCH candidates collide with SSB position, a UE may still perform decoding of PDCCH candidates.

SSB Pattern

As mentioned above, for systems operating above 52.6 GHz carrier frequency, it is envisioned that single carrier based waveform is needed in order to handle issues including low power amplifier (PA) efficiency and large phase noise. In this case, when DFT-s-OFDM is used for the transmission of PBCH, the SSB pattern within a slot and SSB burst set may be redesigned in accordance with embodiments of the present disclosure. Embodiments of synchronization signal block (SSB) pattern for DFT-s-OFDM waveform for system operating above 52.6 GHz carrier frequency are provided as follows:

In one embodiment, depending on the number of symbols allocated for SSB transmission, the SSB pattern within a slot may be defined accordingly. In case when 4 symbols are used for the transmission of SSB, when SSB including PBCH occupies the full minimum system bandwidth, it may not be necessary to reserve first and last two symbols for DL and UL control transmission. In this case, whole slot may be allocated for SSB beam sweeping. Further, SSB may across the slot boundary if slot has 14 symbols. If slot has K*14 symbols, e.g., K=2, 7 SSB positions may be allocated within one slot.

Figure 21:
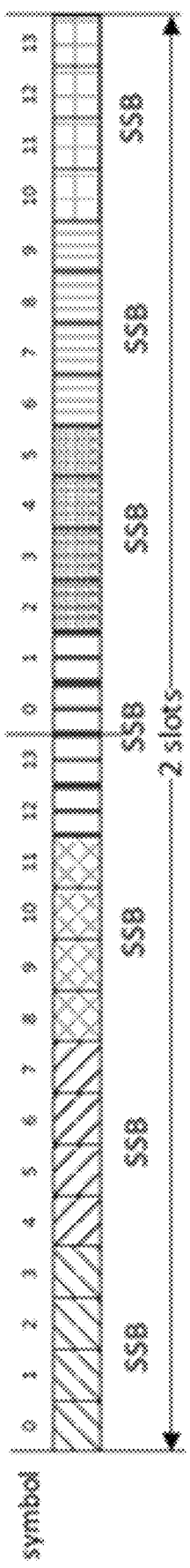
FIG. 21 illustrates an example SSB pattern in accordance with various embodiments.

FIG. 21 illustrates one example of SSB pattern for the option 1. In the figure, 7 SSB candidate positions are allocated in 2 slots.

Figure 22:
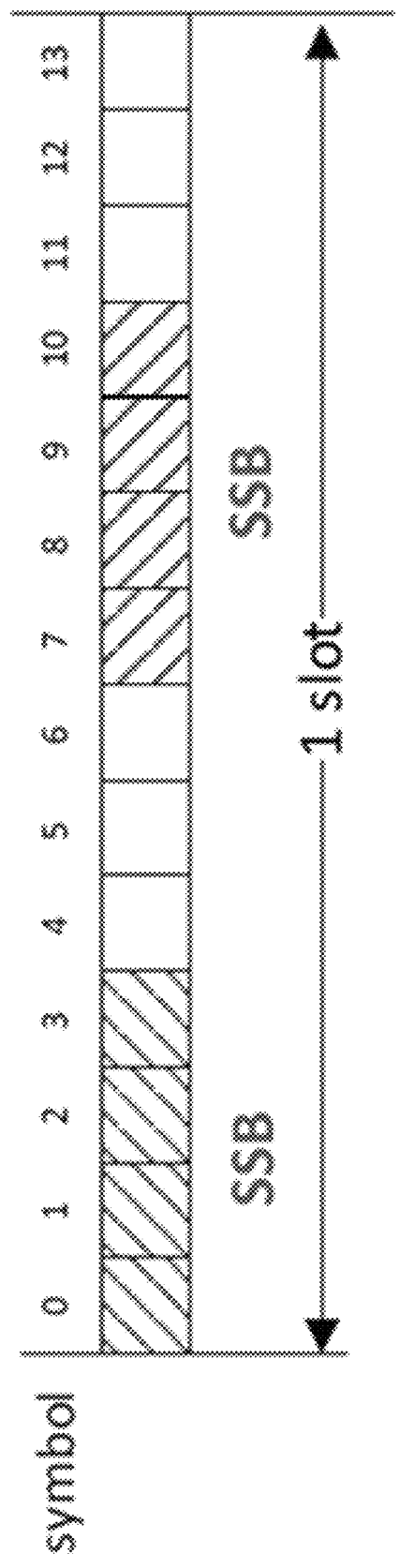
FIG. 22 illustrates another example SSB pattern in accordance with various embodiments.

In another embodiment of the disclosure, in case when PBCH DMRS is used for channel estimation of other DL physical channels, SSB may be allocated at the beginning of one slot or half slot. FIG. 22 illustrates one example of SSB pattern for the Option 2. In the example, two SSB positions are allocated within one slot, where SSB starts from half slot boundary, e.g., symbol #0 and #7 in a slot.

Figure 23:
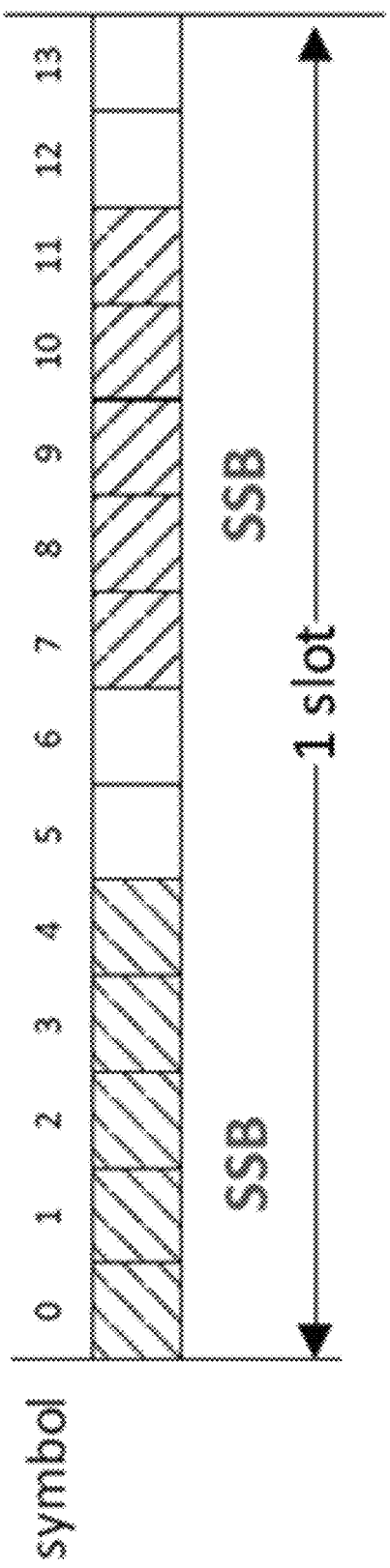
FIG. 23 illustrates another example SSB pattern in accordance with various embodiments.

FIG. 23 illustrates one example of SSB pattern for the Option 2. In the example, two SSB positions are allocated within one slot, where SSB starts from half slot boundary, e.g., symbol #0 and #7 in a slot. Additionally, the SSB includes 5 symbols.

In another embodiment, when the number of symbols for SSB transmission is 5, first two symbols in half slot boundary may be reserved for other DL physical channels/signals. In this case, SSB can be allocated in the remaining part of half slots within one slot.

Figure 24:
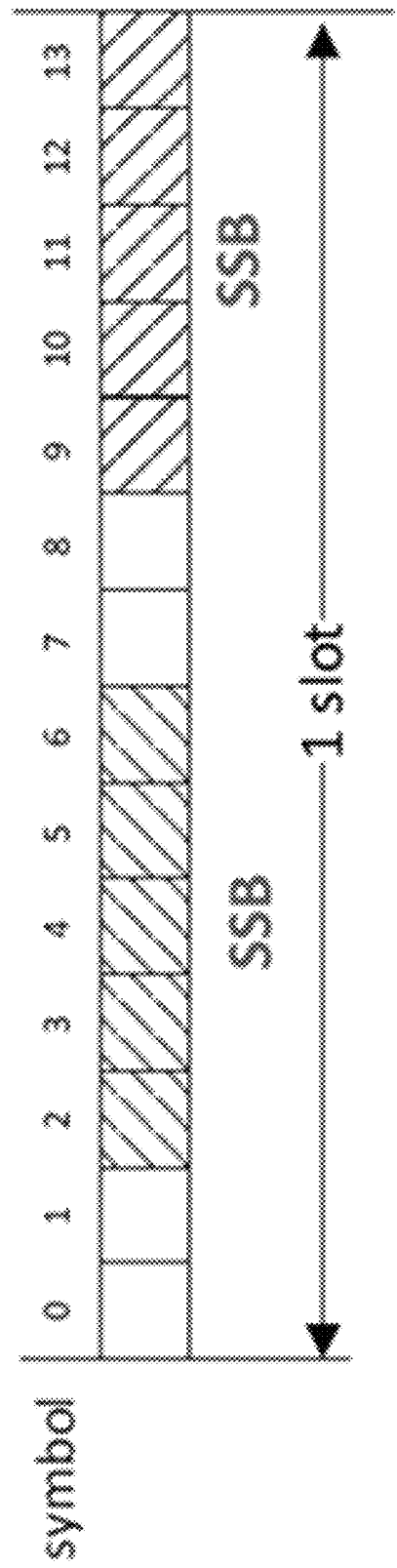
FIG. 24 illustrates another example SSB pattern in accordance with various embodiments.

FIG. 24 illustrates one example of SSB pattern for the Option 3. In the example, two SSB positions are allocated within one slot, where SSB starts from symbol #2 and #9 in a slot.

Systems and Implementations

Figure 29:
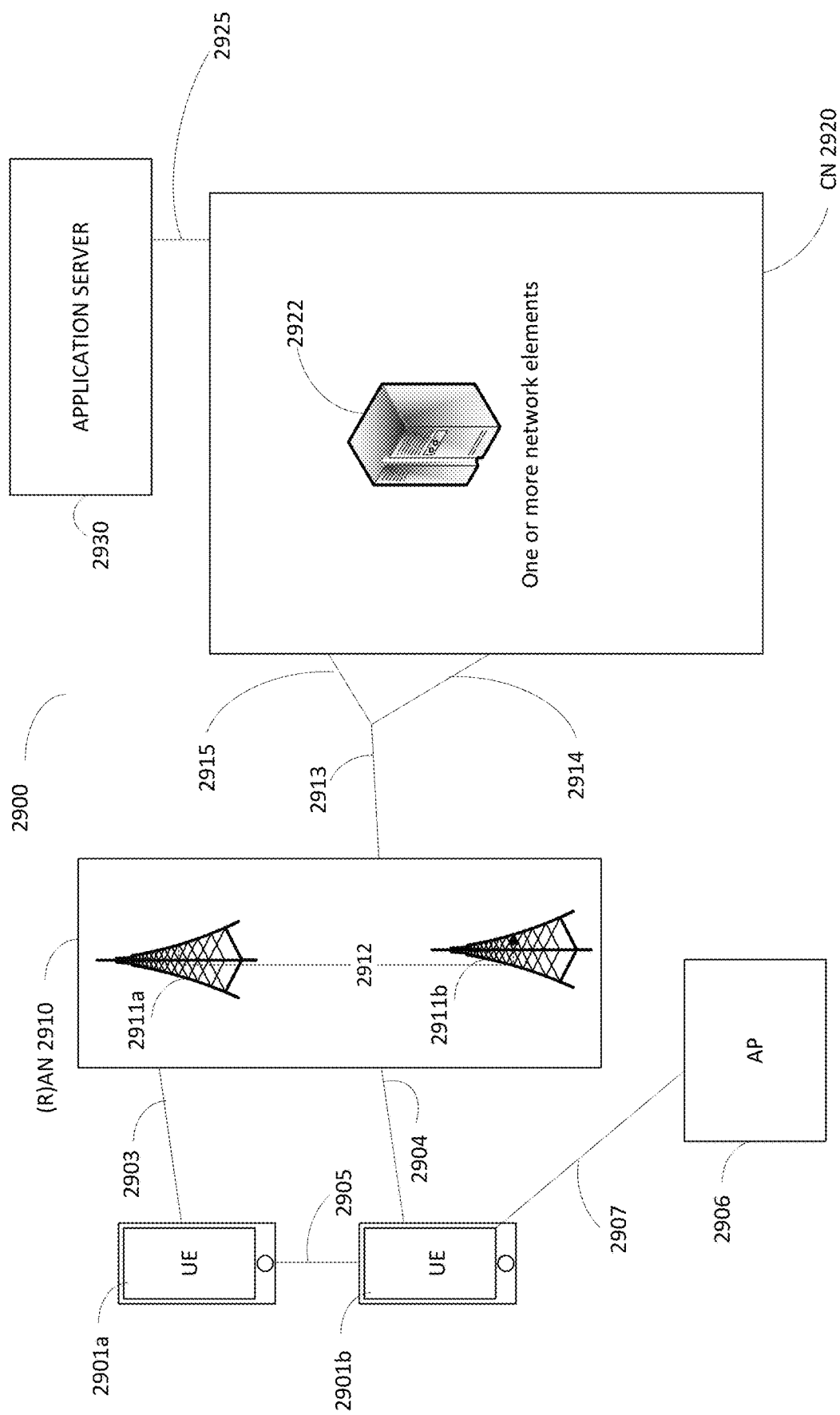
FIG. 29 illustrates an example architecture of a system of a network, in accordance with various embodiments.

FIG. 29 illustrates an example architecture of a system 2900 of a network, in accordance with various embodiments. The following description is provided for an example system 2900 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 29, the system 2900 includes UE 2901a and UE 2901b (collectively referred to as "UEs 2901" or "UE 2901"). In this example, UEs 2901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 2901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2901 may be configured to connect, for example, communicatively couple, with an or RAN 2910. In embodiments, the RAN 2910 may be an NG RAN or a 5G RAN, an E-UTRAN, or a legacy RAN, such as a UTRAN or GERAN. As used herein, the term "NG RAN" or the like may refer to a RAN 2910 that operates in an NR or 5G system 2900, and the term "E-UTRAN" or the like may refer to a RAN 2910 that operates in an LTE or 4G system 2900. The UEs 2901 utilize connections (or channels) 2903 and 2904, respectively, each of which comprises a physical communications interface or layer (discussed in further detail below).

In this example, the connections 2903 and 2904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 2901 may directly exchange communication data via a ProSe interface 2905. The ProSe interface 2905 may alternatively be referred to as a SL interface 2905 and may comprise one or more logical channels, including but not limited to a PSCCH, a PSSCH, a PSDCH, and a PSBCH.

The UE 2901b is shown to be configured to access an AP 2906 (also referred to as "WLAN node 2906," "WLAN 2906," "WLAN Termination 2906," "WT 2906" or the like) via connection 2907. The connection 2907 can comprise a local wireless connection, such as a connection consistent with any IEEE 802.11 protocol, wherein the AP 2906 would comprise a wireless fidelity (Wi-Fi®) router. In this example, the AP 2906 is shown to be connected to the Internet without connecting to the core network of the wireless system (described in further detail below). In various embodiments, the UE 2901b, RAN 2910, and AP 2906 may be configured to utilize LWA operation and/or LWIP operation. The LWA operation may involve the UE 2901b in RRC_CONNECTED being configured by a RAN node 2911a-b to utilize radio resources of LTE and WLAN. LWIP operation may involve the UE 2901b using WLAN radio resources (e.g., connection 2907) via IPsec protocol tunneling to authenticate and encrypt packets (e.g., IP packets) sent over the connection 2907. IPsec tunneling may include encapsulating the entirety of original IP packets and adding a new packet header, thereby protecting the original header of the IP packets.

The RAN 2910 can include one or more AN nodes or RAN nodes 2911a and 2911b (collectively referred to as "RAN nodes 2911" or "RAN node 2911") that enable the connections 2903 and 2904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 2911 that operates in an NR or 5G system 2900 (for example, a gNB), and the term "E-UTRAN node" or the like may refer to a RAN node 2911 that operates in an LTE or 4G system 2900 (e.g., an eNB). According to various embodiments, the RAN nodes 2911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 2911 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 2911; a MAC/PHY split wherein RRC, PDCP, RLC, and MAC layers are operated by the CRAN/vBBUP and the PHY layer is operated by individual RAN nodes 2911; or a "lower PHY" split wherein RRC, PDCP, RLC, MAC layers and upper portions of the PHY layer are operated by the CRAN/vBBUP and lower portions of the PHY layer are operated by individual RAN nodes 2911. This virtualized framework allows the freed-up processor cores of the RAN nodes 2911 to perform other virtualized applications. In some implementations, an individual RAN node 2911 may represent individual gNB-DUs that are connected to a gNB-CU via individual F1 interfaces (not shown by FIG. 29). In these implementations, the gNB-DUs may include one or more remote radio heads or RFEMs (see, e.g., FIG. 30), and the gNB-CU may be operated by a server that is located in the RAN 2910 (not shown) or by a server pool in a similar manner as the CRAN/vBBUP. Additionally or alternatively, one or more of the RAN nodes 2911 may be next generation eNBs (ng-eNBs), which are RAN nodes that provide E-UTRA user plane and control plane protocol terminations toward the UEs 2901, and are connected to a 5GC (e.g., CN XR220 of Figure XR2) via an NG interface (discussed infra).

In V2X scenarios one or more of the RAN nodes 2911 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 2901 (vUEs 2901). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 2911 can terminate the air interface protocol and can be the first point of contact for the UEs 2901. In some embodiments, any of the RAN nodes 2911 can fulfill various logical functions for the RAN 2910 including, but not limited to, radio network controller (RNC) functions such as radio bearer management, uplink and downlink dynamic radio resource management and data packet scheduling, and mobility management.

In embodiments, the UEs 2901 can be configured to communicate using OFDM communication signals with each other or with any of the RAN nodes 2911 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2911 to the UEs 2901, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 2901 and the RAN nodes 2911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 2901 and the RAN nodes 2911 may operate using LAA, eLAA, and/or feLAA mechanisms. In these implementations, the UEs 2901 and the RAN nodes 2911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 2901 RAN nodes 2911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 2901, AP 2906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 2901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 2901. The PDCCH carries information about the transport format and resource allocations related to the PDSCH channel, among other things. It may also inform the UEs 2901 about the transport format, resource allocation, and HARQ information related to the uplink shared channel. Typically, downlink scheduling (assigning control and shared channel resource blocks to the UE 2901b within a cell) may be performed at any of the RAN nodes 2911 based on channel quality information fed back from any of the UEs 2901. The downlink resource assignment information may be sent on the PDCCH used for (e.g., assigned to) each of the UEs 2901.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 2911 may be configured to communicate with one another via interface 2912. In embodiments where the system 2900 is an LTE system (e.g., when CN 2920 is an EPC XR120 as in Figure XR1), the interface 2912 may be an X2 interface 2912. The X2 interface may be defined between two or more RAN nodes 2911 (e.g., two or more eNBs and the like) that connect to EPC 2920, and/or between two eNBs connecting to EPC 2920. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 2901 from an SeNB for user data; information of PDCP PDUs that were not delivered to a UE 2901; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 2900 is a 5G or NR system (e.g., when CN 2920 is an 5GC XR220 as in Figure XR2), the interface 2912 may be an Xn interface 2912. The Xn interface is defined between two or more RAN nodes 2911 (e.g., two or more gNBs and the like) that connect to 5GC 2920, between a RAN node 2911 (e.g., a gNB) connecting to 5GC 2920 and an eNB, and/or between two eNBs connecting to 5GC 2920. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2901 in a connected mode (e.g., CM-CONNECTED) including functionality to manage the UE mobility for connected mode between one or more RAN nodes 2911. The mobility support may include context transfer from an old (source) serving RAN node 2911 to new (target) serving RAN node 2911; and control of user plane tunnels between old (source) serving RAN node 2911 to new (target) serving RAN node 2911. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 2910 is shown to be communicatively coupled to a core network—in this embodiment, core network (CN) 2920. The CN 2920 may comprise a plurality of network elements 2922, which are configured to offer various data and telecommunications services to customers/subscribers (e.g., users of UEs 2901) who are connected to the CN 2920 via the RAN 2910. The components of the CN 2920 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 2920 may be referred to as a network slice, and a logical instantiation of a portion of the CN 2920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 2930 may be an element offering applications that use IP bearer resources with the core network (e.g., UMTS PS domain, LTE PS data services, etc.). The application server 2930 can also be configured to support one or more communication services (e.g., VoIP sessions, PTT sessions, group communication sessions, social networking services, etc.) for the UEs 2901 via the EPC 2920.

In embodiments, the CN 2920 may be a 5GC (referred to as "5GC 2920" or the like), and the RAN 2910 may be connected with the CN 2920 via an NG interface 2913. In embodiments, the NG interface 2913 may be split into two parts, an NG user plane (NG-U) interface 2914, which carries traffic data between the RAN nodes 2911 and a UPF, and the S1 control plane (NG-C) interface 2915, which is a signaling interface between the RAN nodes 2911 and AMFs. Embodiments where the CN 2920 is a 5GC 2920 are discussed in more detail with regard to Figure XR2.

In embodiments, the CN 2920 may be a 5G CN (referred to as "5GC 2920" or the like), while in other embodiments, the CN 2920 may be an EPC). Where CN 2920 is an EPC (referred to as "EPC 2920" or the like), the RAN 2910 may be connected with the CN 2920 via an S1 interface 2913. In embodiments, the S1 interface 2913 may be split into two parts, an S1 user plane (S1-U) interface 2914, which carries traffic data between the RAN nodes 2911 and the S-GW, and the S1-MME interface 2915, which is a signaling interface between the RAN nodes 2911 and MMES.

Figure 30:
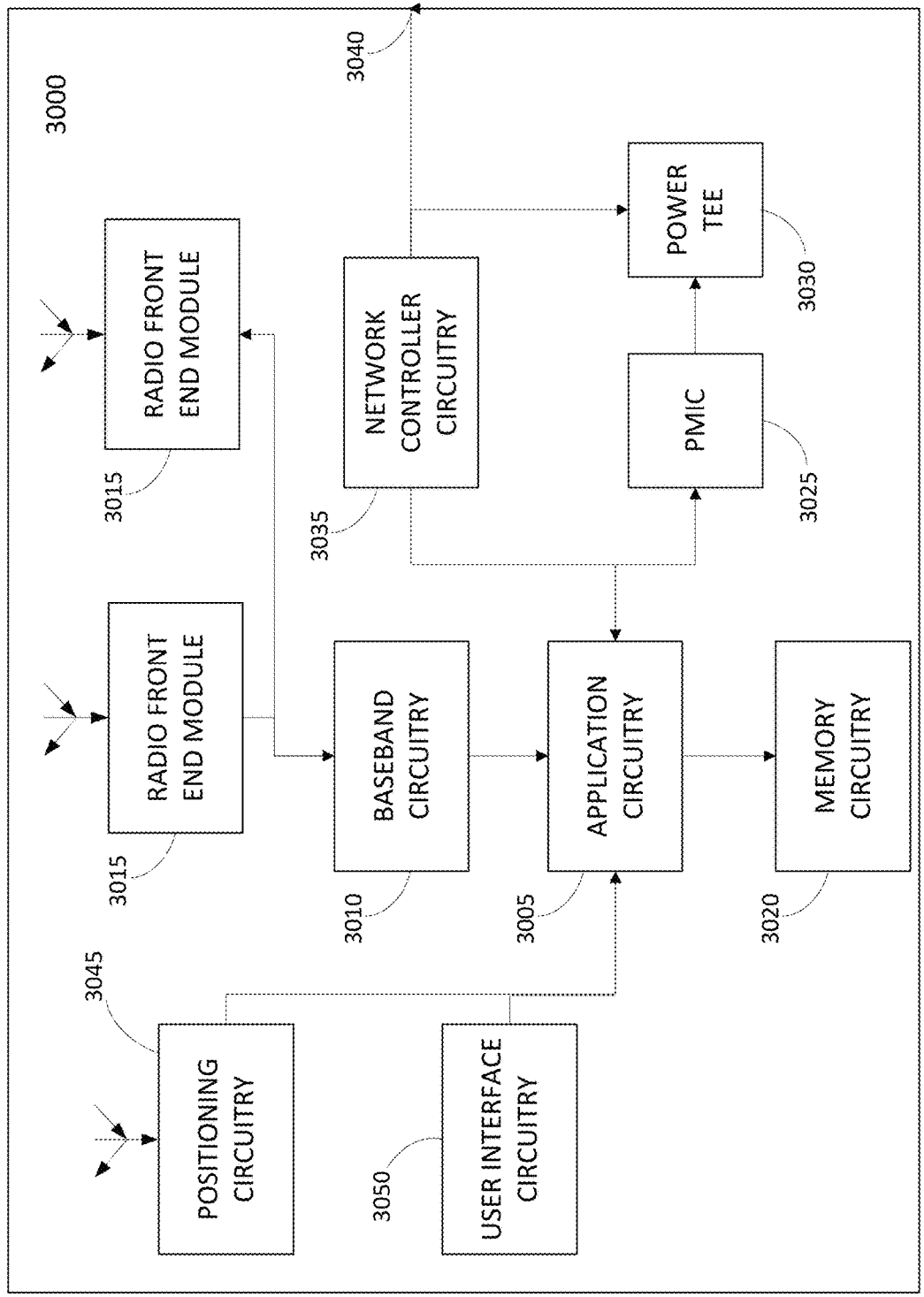
FIG. 30 illustrates an example of infrastructure equipment in accordance with various embodiments.

FIG. 30 illustrates an example of infrastructure equipment 3000 in accordance with various embodiments. The infrastructure equipment 3000 (or "system 3000") may be implemented as a base station, radio head, RAN node such as the RAN nodes 2911 and/or AP 2906 shown and described previously, application server(s) 2930, and/or any other element/device discussed herein. In other examples, the system 3000 could be implemented in or by a UE.

The system 3000 includes application circuitry 3005, baseband circuitry 3010, one or more radio front end modules (RFEMs) 3015, memory circuitry 3020, power management integrated circuitry (PMIC) 3025, power tee circuitry 3030, network controller circuitry 3035, network interface connector 3040, satellite positioning circuitry 3045, and user interface 3050. In some embodiments, the device 3000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 3005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 3005 may be coupled with or may include memory/storage elements and may be configured to execute instructions stored in the memory/storage to enable various applications or operating systems to run on the system 3000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 3005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 3005 may comprise, or may be, a special-purpose processor/controller to operate according to the various embodiments herein. As examples, the processor(s) of application circuitry 3005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 3000 may not utilize application circuitry 3005, and instead may include a special-purpose processor/controller to process IP data received from an EPC or 5GC, for example.

In some implementations, the application circuitry 3005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 3005 may comprise logic blocks or logic fabric, and other interconnected resources that may be programmed to perform various functions, such as the procedures, methods, functions, etc. of the various embodiments discussed herein. In such embodiments, the circuitry of application circuitry 3005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 3010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 3010 are discussed infra with regard to FIG. 32.

User interface circuitry 3050 may include one or more user interfaces designed to enable user interaction with the system 3000 or peripheral component interfaces designed to enable peripheral component interaction with the system 3000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 3015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 3211 of FIG. 32 infra), and the RFEM may be connected to multiple antennas. In alternative implementations, both mmWave and sub-mmWave radio functions may be implemented in the same physical RFEM 3015, which incorporates both mmWave antennas and sub-mmWave.

The memory circuitry 3020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 3020 may be implemented as one or more of solder down packaged integrated circuits, socketed memory modules and plug-in memory cards.

The PMIC 3025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 3030 may provide for electrical power drawn from a network cable to provide both power supply and data connectivity to the infrastructure equipment 3000 using a single cable.

The network controller circuitry 3035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 3000 via network interface connector 3040 using a physical connection, which may be electrical (commonly referred to as a "copper interconnect"), optical, or wireless. The network controller circuitry 3035 may include one or more dedicated processors and/or FPGAs to communicate using one or more of the aforementioned protocols. In some implementations, the network controller circuitry 3035 may include multiple controllers to provide connectivity to other networks using the same or different protocols.

The positioning circuitry 3045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 3045 may include a Micro-Technology for Positioning, Navigation, and Timing (Micro-PNT) IC that uses a master timing clock to perform position tracking/estimation without GNSS assistance. The positioning circuitry 3045 may also be part of, or interact with, the baseband circuitry 3010 and/or RFEMs 3015 to communicate with the nodes and components of the positioning network. The positioning circuitry 3045 may also provide position data and/or time data to the application circuitry 3005, which may use the data to synchronize operations with various infrastructure (e.g., RAN nodes 2911, etc.), or the like.

The components shown by FIG. 30 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 31:
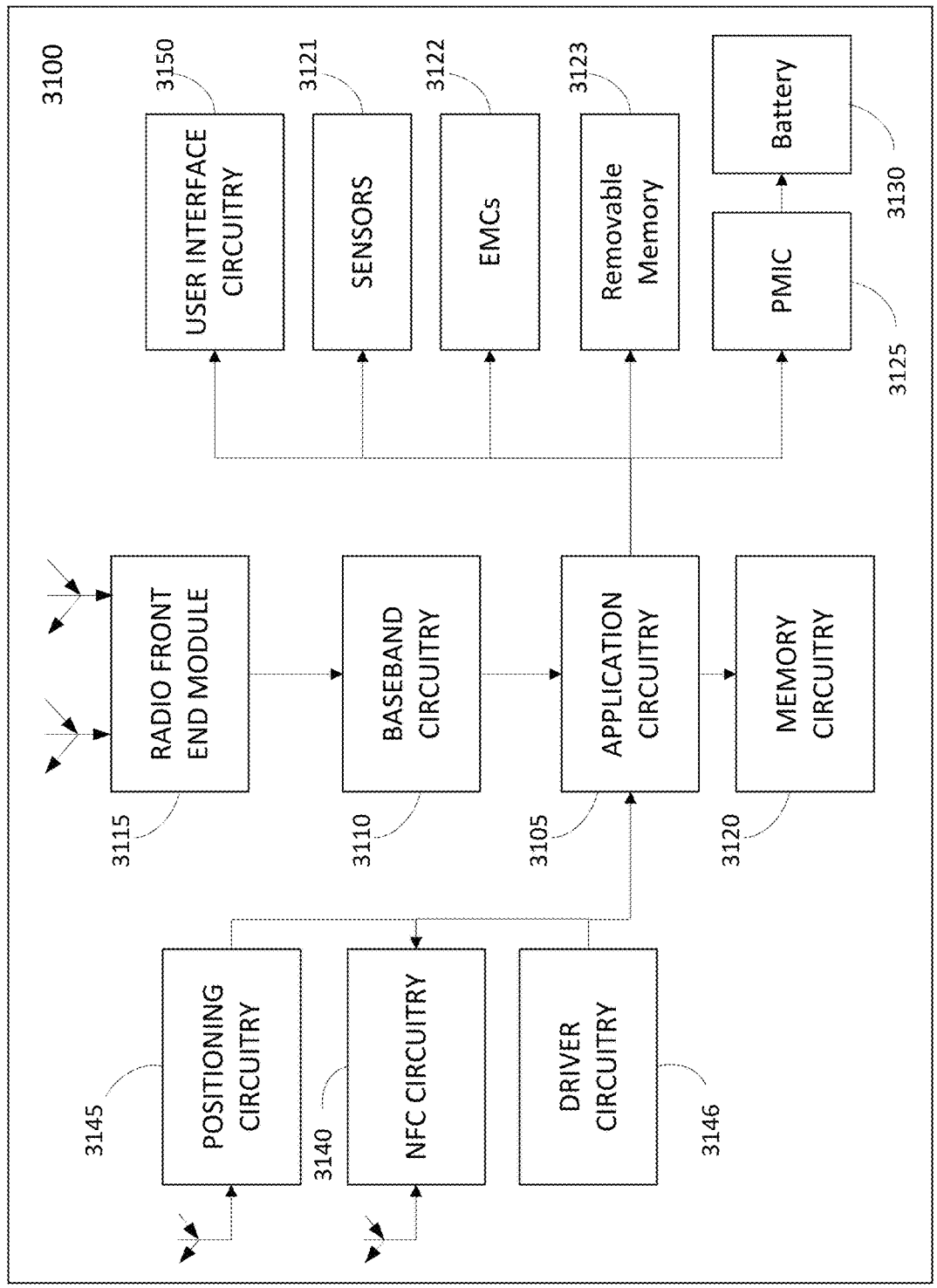
FIG. 31 depicts example components of a computer platform or device in accordance with various embodiments.

FIG. 31 illustrates an example of a platform 3100 (or "device 3100") in accordance with various embodiments. In embodiments, the computer platform 3100 may be suitable for use as UEs 2901, XR101, XR201, application servers 2930, and/or any other element/device discussed herein. The platform 3100 may include any combinations of the components shown in the example. The components of platform 3100 may be implemented as integrated circuits (ICs), portions thereof, discrete electronic devices, or other modules, logic, hardware, software, firmware, or a combination thereof adapted in the computer platform 3100, or as components otherwise incorporated within a chassis of a larger system. The block diagram of FIG. 31 is intended to show a high level view of components of the computer platform 3100. However, some of the components shown may be omitted, additional components may be present, and different arrangement of the components shown may occur in other implementations.

Application circuitry 3105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 3105 may be coupled with or may include memory/storage elements and may be configured to execute instructions stored in the memory/storage to enable various applications or operating systems to run on the system 3100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 3005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 3005 may comprise, or may be, a special-purpose processor/controller to operate according to the various embodiments herein.

As examples, the processor(s) of application circuitry 3105 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 3105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 3105 may be a part of a system on a chip (SoC) in which the application circuitry 3105 and other components are formed into a single integrated circuit, or a single package, such as the Edison™ or Galileo™ SoC boards from Intel® Corporation.

Additionally or alternatively, application circuitry 3105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 3105 may comprise logic blocks or logic fabric, and other interconnected resources that may be programmed to perform various functions, such as the procedures, methods, functions, etc. of the various embodiments discussed herein. In such embodiments, the circuitry of application circuitry 3105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 3110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 3110 are discussed infra with regard to FIG. 32.

The RFEMs 3115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 3211 of FIG. 32 infra), and the RFEM may be connected to multiple antennas. In alternative implementations, both mmWave and sub-mmWave radio functions may be implemented in the same physical RFEM 3115, which incorporates both mmWave antennas and sub-mmWave.

The memory circuitry 3120 may include any number and type of memory devices used to provide for a given amount of system memory. As examples, the memory circuitry 3120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAIVI), etc. The memory circuitry 3120 may be developed in accordance with a Joint Electron Devices Engineering Council (JEDEC) low power double data rate (LPDDR)-based design, such as LPDDR2, LPDDR3, LPDDR4, or the like. Memory circuitry 3120 may be implemented as one or more of solder down packaged integrated circuits, single die package (SDP), dual die package (DDP) or quad die package (Q17P), socketed memory modules, dual inline memory modules (DIMIVIs) including microDIMMs or MiniDIMMs, and/or soldered onto a motherboard via a ball grid array (BGA). In low power implementations, the memory circuitry 3120 may be on-die memory or registers associated with the application circuitry 3105. To provide for persistent storage of information such as data, applications, operating systems and so forth, memory circuitry 3120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 3100 may incorporate the three-dimensional (3D) cross-point (XPOINT) memories from Intel® and Micron®.

Removable memory circuitry 3123 may include devices, circuitry, enclosures/housings, ports or receptacles, etc. used to couple portable data storage devices with the platform 3100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 3100 may also include interface circuitry (not shown) that is used to connect external devices with the platform 3100. The external devices connected to the platform 3100 via the interface circuitry include sensor circuitry 3121 and electro-mechanical components (EMCs) 3122, as well as removable memory devices coupled to removable memory circuitry 3123.

The sensor circuitry 3121 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 3122 include devices, modules, or subsystems whose purpose is to enable platform 3100 to change its state, position, and/or orientation, or move or control a mechanism or (sub)system. Additionally, EMCs 3122 may be configured to generate and send messages/signaling to other components of the platform 3100 to indicate a current state of the EMCs 3122. Examples of the EMCs 3122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 3100 is configured to operate one or more EMCs 3122 based on one or more captured events and/or instructions or control signals received from a service provider and/or various clients.

In some implementations, the interface circuitry may connect the platform 3100 with positioning circuitry 3145. The positioning circuitry 3145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 3145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 3145 may include a Micro-PNT IC that uses a master timing clock to perform position tracking/estimation without GNSS assistance. The positioning circuitry 3145 may also be part of, or interact with, the baseband circuitry 3010 and/or RFEMs 3115 to communicate with the nodes and components of the positioning network. The positioning circuitry 3145 may also provide position data and/or time data to the application circuitry 3105, which may use the data to synchronize operations with various infrastructure (e.g., radio base stations), for turn-by-turn navigation applications, or the like In some implementations, the interface circuitry may connect the platform 3100 with Near-Field Communication (NFC) circuitry 3140. NFC circuitry 3140 is configured to provide contactless, short-range communications based on radio frequency identification (RFID) standards, wherein magnetic field induction is used to enable communication between NFC circuitry 3140 and NFC-enabled devices external to the platform 3100 (e.g., an "NFC touchpoint"). NFC circuitry 3140 comprises an NFC controller coupled with an antenna element and a processor coupled with the NFC controller. The NFC controller may be a chip/IC providing NFC functionalities to the NFC circuitry 3140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 3140, or initiate data transfer between the NFC circuitry 3140 and another active NFC device (e.g., a smartphone or an NFC-enabled POS terminal) that is proximate to the platform 3100.

The driver circuitry 3146 may include software and hardware elements that operate to control particular devices that are embedded in the platform 3100, attached to the platform 3100, or otherwise communicatively coupled with the platform 3100. The driver circuitry 3146 may include individual drivers allowing other components of the platform 3100 to interact with or control various input/output (I/O) devices that may be present within, or connected to, the platform 3100. For example, driver circuitry 3146 may include a display driver to control and allow access to a display device, a touchscreen driver to control and allow access to a touchscreen interface of the platform 3100, sensor drivers to obtain sensor readings of sensor circuitry 3121 and control and allow access to sensor circuitry 3121, EMC drivers to obtain actuator positions of the EMCs 3122 and/or control and allow access to the EMCs 3122, a camera driver to control and allow access to an embedded image capture device, audio drivers to control and allow access to one or more audio devices.

The power management integrated circuitry (PMIC) 3125 (also referred to as "power management circuitry 3125") may manage power provided to various components of the platform 3100. In particular, with respect to the baseband circuitry 3110, the PMIC 3125 may control power-source selection, voltage scaling, battery charging, or DC-to-DC conversion. The PMIC 3125 may often be included when the platform 3100 is capable of being powered by a battery 3130, for example, when the device is included in a UE 2901, XR101, XR201.

In some embodiments, the PMIC 3125 may control, or otherwise be part of, various power saving mechanisms of the platform 3100. For example, if the platform 3100 is in an RRC_Connected state, where it is still connected to the RAN node as it expects to receive traffic shortly, then it may enter a state known as Discontinuous Reception Mode (DRX) after a period of inactivity. During this state, the platform 3100 may power down for brief intervals of time and thus save power. If there is no data traffic activity for an extended period of time, then the platform 3100 may transition off to an RRC_Idle state, where it disconnects from the network and does not perform operations such as channel quality feedback, handover, etc. The platform 3100 goes into a very low power state and it performs paging where again it periodically wakes up to listen to the network and then powers down again. The platform 3100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 3130 may power the platform 3100, although in some examples the platform 3100 may be mounted deployed in a fixed location, and may have a power supply coupled to an electrical grid. The battery 3130 may be a lithium ion battery, a metal-air battery, such as a zinc-air battery, an aluminum-air battery, a lithium-air battery, and the like. In some implementations, such as in V2X applications, the battery 3130 may be a typical lead-acid automotive battery.

In some implementations, the battery 3130 may be a "smart battery," which includes or is coupled with a Battery Management System (BMS) or battery monitoring integrated circuitry. The BMS may be included in the platform 3100 to track the state of charge (SoCh) of the battery 3130. The BMS may be used to monitor other parameters of the battery 3130 to provide failure predictions, such as the state of health (SoH) and the state of function (SoF) of the battery 3130. The BMS may communicate the information of the battery 3130 to the application circuitry 3105 or other components of the platform 3100. The BMS may also include an analog-to-digital (ADC) convertor that allows the application circuitry 3105 to directly monitor the voltage of the battery 3130 or the current flow from the battery 3130. The battery parameters may be used to determine actions that the platform 3100 may perform, such as transmission frequency, network operation, sensing frequency, and the like.

A power block, or other power supply coupled to an electrical grid may be coupled with the BMS to charge the battery 3130. In some examples, the power block XS30 may be replaced with a wireless power receiver to obtain the power wirelessly, for example, through a loop antenna in the computer platform 3100. In these examples, a wireless battery charging circuit may be included in the BMS. The specific charging circuits chosen may depend on the size of the battery 3130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 3150 includes various input/output (I/O) devices present within, or connected to, the platform 3100, and includes one or more user interfaces designed to enable user interaction with the platform 3100 and/or peripheral component interfaces designed to enable peripheral component interaction with the platform 3100. The user interface circuitry 3150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3100. The output device circuitry may also include speakers or other audio emitting devices, printer(s), and/or the like. In some embodiments, the sensor circuitry 3121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 3100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 32:
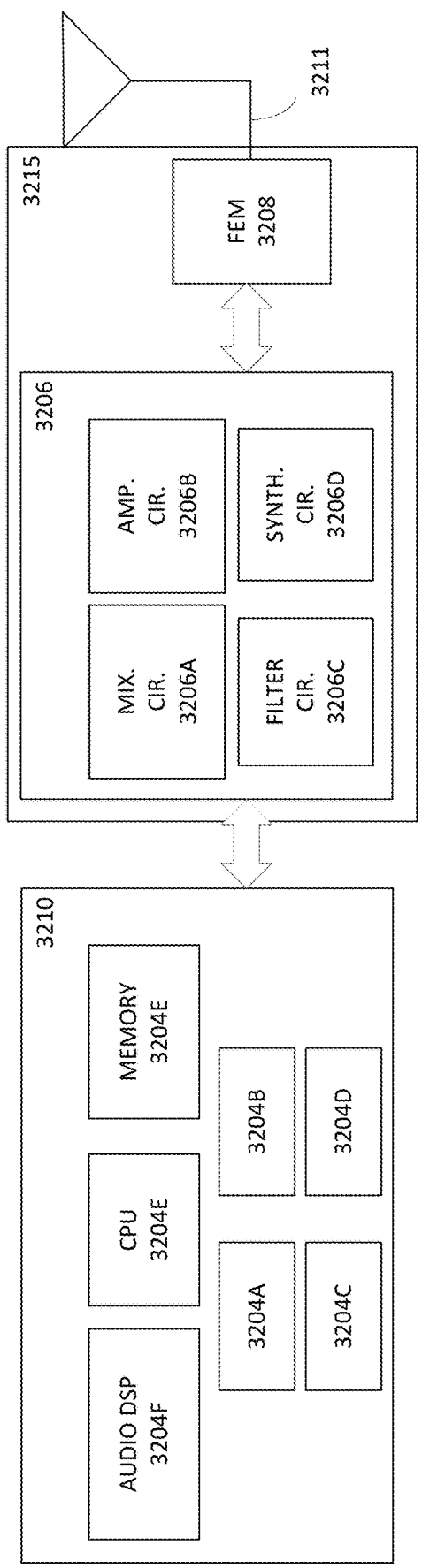
FIG. 32 depicts example components of baseband circuitry and radio frequency end modules in accordance with various embodiments.

FIG. 32 illustrates example components of baseband circuitry 3210 and radio front end modules (RFEM) 3215 in accordance with various embodiments. The baseband circuitry 3210 corresponds to the baseband circuitry 3010 and 3110 of FIGS. 30 and 31, respectively. The RFEM 3215 corresponds to the RFEM 3015 and 3115 of FIGS. 30 and 31, respectively. As shown, the RFEMs 3215 may include Radio Frequency (RF) circuitry 3206, front-end module (FEM) circuitry 3208, antenna array 3211 coupled together at least as shown.

The baseband circuitry 3210 includes circuitry and/or control logic configured to carry out various radio/network protocol and radio control functions that enable communication with one or more radio networks via the RF circuitry 3206. The radio control functions may include, but are not limited to, signal modulation/demodulation, encoding/decoding, radio frequency shifting, etc. In some embodiments, modulation/demodulation circuitry of the baseband circuitry 3210 may include Fast-Fourier Transform (FFT), precoding, or constellation mapping/demapping functionality. In some embodiments, encoding/decoding circuitry of the baseband circuitry 3210 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 3210 is configured to process baseband signals received from a receive signal path of the RF circuitry 3206 and to generate baseband signals for a transmit signal path of the RF circuitry 3206. The baseband circuitry 3210 is configured to interface with application circuitry 3005/3105 (see FIGS. 30 and 31) for generation and processing of the baseband signals and for controlling operations of the RF circuitry 3206. The baseband circuitry 3210 may handle various radio control functions.

The aforementioned circuitry and/or control logic of the baseband circuitry 3210 may include one or more single or multi-core processors. For example, the one or more processors may include a 3G baseband processor 3204A, a 4G/LTE baseband processor 3204B, a 5G/NR baseband processor 3204C, or some other baseband processor(s) 3204D for other existing generations, generations in development or to be developed in the future (e.g., sixth generation (6G), etc.). In other embodiments, some or all of the functionality of baseband processors 3204A-D may be included in modules stored in the memory 3204G and executed via a Central Processing Unit (CPU) 3204E. In other embodiments, some or all of the functionality of baseband processors 3204A-D may be provided as hardware accelerators (e.g., FPGAs, ASICs, etc.) loaded with the appropriate bit streams or logic blocks stored in respective memory cells. In various embodiments, the memory 3204G may store program code of a real-time OS (RTOS), which when executed by the CPU 3204E (or other baseband processor), is to cause the CPU 3204E (or other baseband processor) to manage resources of the baseband circuitry 3210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 3210 includes one or more audio digital signal processor(s) (DSP) 3204F. The audio DSP(s) 3204F include elements for compression/decompression and echo cancellation and may include other suitable processing elements in other embodiments.

In some embodiments, each of the processors 3204A-3204E include respective memory interfaces to send/receive data to/from the memory 3204G. The baseband circuitry 3210 may further include one or more interfaces to communicatively couple to other circuitries/devices, such as an interface to send/receive data to/from memory external to the baseband circuitry 3210; an application circuitry interface to send/receive data to/from the application circuitry 3005/3105 of FIGS. 30-XT); an RF circuitry interface to send/receive data to/from RF circuitry 3206 of FIG. 32; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 3125.

In alternate embodiments (which may be combined with the above described embodiments), baseband circuitry 3210 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 3210 may include protocol processing circuitry with one or more instances of control circuitry (not shown) to provide control functions for the digital baseband circuitry and/or radio frequency circuitry (e.g., the radio front end modules 3215).

Although not shown by FIG. 32, in some embodiments, the baseband circuitry 3210 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 3210 and/or RF circuitry 3206 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 3210 and/or RF circuitry 3206 are part of a Wi-Fi communication system. In the second example, the protocol processing circuitry would operate Wi-Fi MAC and logical link control (LLC) functions. The protocol processing circuitry may include one or more memory structures (e.g., 3204G) to store program code and data for operating the protocol functions, as well as one or more processing cores to execute the program code and perform various operations using the data. The baseband circuitry 3210 may also support radio communications for more than one wireless protocol.

The various hardware elements of the baseband circuitry 3210 discussed herein may be implemented, for example, as a solder-down substrate including one or more integrated circuits (ICs), a single packaged IC soldered to a main circuit board or a multi-chip module containing two or more ICs. In one example, the components of the baseband circuitry 3210 may be suitably combined in a single chip or chipset, or disposed on a same circuit board. In another example, some or all of the constituent components of the baseband circuitry 3210 and RF circuitry 3206 may be implemented together such as, for example, a system on a chip (SoC) or System-in-Package (SiP). In another example, some or all of the constituent components of the baseband circuitry 3210 may be implemented as a separate SoC that is communicatively coupled with and RF circuitry 3206 (or multiple instances of RF circuitry 3206). In yet another example, some or all of the constituent components of the baseband circuitry 3210 and the application circuitry 3005/3105 may be implemented together as individual SoCs mounted to a same circuit board (e.g., a "multi-chip package").

In some embodiments, the baseband circuitry 3210 may provide for communication compatible with one or more radio technologies. For example, in some embodiments, the baseband circuitry 3210 may support communication with an E-UTRAN or other WMAN, a WLAN, a WPAN. Embodiments in which the baseband circuitry 3210 is configured to support radio communications of more than one wireless protocol may be referred to as multi-mode baseband circuitry.

RF circuitry 3206 may enable communication with wireless networks using modulated electromagnetic radiation through a non-solid medium. In various embodiments, the RF circuitry 3206 may include switches, filters, amplifiers, etc. to facilitate the communication with the wireless network. RF circuitry 3206 may include a receive signal path, which may include circuitry to down-convert RF signals received from the FEM circuitry 3208 and provide baseband signals to the baseband circuitry 3210. RF circuitry 3206 may also include a transmit signal path, which may include circuitry to up-convert baseband signals provided by the baseband circuitry 3210 and provide RF output signals to the FEM circuitry 3208 for transmission.

In some embodiments, the receive signal path of the RF circuitry 3206 may include mixer circuitry 3206a, amplifier circuitry 3206b and filter circuitry 3206c. In some embodiments, the transmit signal path of the RF circuitry 3206 may include filter circuitry 3206c and mixer circuitry 3206a. RF circuitry 3206 may also include synthesizer circuitry 3206d for synthesizing a frequency for use by the mixer circuitry 3206a of the receive signal path and the transmit signal path. In some embodiments, the mixer circuitry 3206a of the receive signal path may be configured to down-convert RF signals received from the FEM circuitry 3208 based on the synthesized frequency provided by synthesizer circuitry 3206d. The amplifier circuitry 3206b may be configured to amplify the down-converted signals and the filter circuitry 3206c may be a low-pass filter (LPF) or band-pass filter (BPF) configured to remove unwanted signals from the down-converted signals to generate output baseband signals. Output baseband signals may be provided to the baseband circuitry 3210 for further processing. In some embodiments, the output baseband signals may be zero-frequency baseband signals, although this is not a requirement. In some embodiments, mixer circuitry 3206a of the receive signal path may comprise passive mixers, although the scope of the embodiments is not limited in this respect.

In some embodiments, the mixer circuitry 3206a of the transmit signal path may be configured to up-convert input baseband signals based on the synthesized frequency provided by the synthesizer circuitry 3206d to generate RF output signals for the FEM circuitry 3208. The baseband signals may be provided by the baseband circuitry 3210 and may be filtered by filter circuitry 3206c.

In some embodiments, the mixer circuitry 3206a of the receive signal path and the mixer circuitry 3206a of the transmit signal path may include two or more mixers and may be arranged for quadrature downconversion and upconversion, respectively. In some embodiments, the mixer circuitry 3206a of the receive signal path and the mixer circuitry 3206a of the transmit signal path may include two or more mixers and may be arranged for image rejection (e.g., Hartley image rejection). In some embodiments, the mixer circuitry 3206a of the receive signal path and the mixer circuitry 3206a of the transmit signal path may be arranged for direct downconversion and direct upconversion, respectively. In some embodiments, the mixer circuitry 3206a of the receive signal path and the mixer circuitry 3206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 3206 may include analog-to-digital converter (ADC) and digital-to-analog converter (DAC) circuitry and the baseband circuitry 3210 may include a digital baseband interface to communicate with the RF circuitry 3206.

In some dual-mode embodiments, a separate radio IC circuitry may be provided for processing signals for each spectrum, although the scope of the embodiments is not limited in this respect.

In some embodiments, the synthesizer circuitry 3206d may be a fractional-N synthesizer or a fractional N/N+1 synthesizer, although the scope of the embodiments is not limited in this respect as other types of frequency synthesizers may be suitable. For example, synthesizer circuitry 3206d may be a delta-sigma synthesizer, a frequency multiplier, or a synthesizer comprising a phase-locked loop with a frequency divider.

The synthesizer circuitry 3206d may be configured to synthesize an output frequency for use by the mixer circuitry 3206a of the RF circuitry 3206 based on a frequency input and a divider control input. In some embodiments, the synthesizer circuitry 3206d may be a fractional N/N+1 synthesizer.

In some embodiments, frequency input may be provided by a voltage controlled oscillator (VCO), although that is not a requirement. Divider control input may be provided by either the baseband circuitry 3210 or the application circuitry 3005/3105 depending on the desired output frequency. In some embodiments, a divider control input (e.g., N) may be determined from a look-up table based on a channel indicated by the application circuitry 3005/3105.

Synthesizer circuitry 3206d of the RF circuitry 3206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 3206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 3206 may include an IQ/polar converter.

FEM circuitry 3208 may include a receive signal path, which may include circuitry configured to operate on RF signals received from antenna array 3211, amplify the received signals and provide the amplified versions of the received signals to the RF circuitry 3206 for further processing. FEM circuitry 3208 may also include a transmit signal path, which may include circuitry configured to amplify signals for transmission provided by the RF circuitry 3206 for transmission by one or more of antenna elements of antenna array 3211. In various embodiments, the amplification through the transmit or receive signal paths may be done solely in the RF circuitry 3206, solely in the FEM circuitry 3208, or in both the RF circuitry 3206 and the FEM circuitry 3208.

In some embodiments, the FEM circuitry 3208 may include a TX/RX switch to switch between transmit mode and receive mode operation. The FEM circuitry 3208 may include a receive signal path and a transmit signal path. The receive signal path of the FEM circuitry 3208 may include an LNA to amplify received RF signals and provide the amplified received RF signals as an output (e.g., to the RF circuitry 3206). The transmit signal path of the FEM circuitry 3208 may include a power amplifier (PA) to amplify input RF signals (e.g., provided by RF circuitry 3206), and one or more filters to generate RF signals for subsequent transmission by one or more antenna elements of the antenna array 3211.

The antenna array 3211 comprises one or more antenna elements, each of which is configured convert electrical signals into radio waves to travel through the air and to convert received radio waves into electrical signals. For example, digital baseband signals provided by the baseband circuitry 3210 is converted into analog RF signals (e.g., modulated waveform) that will be amplified and transmitted via the antenna elements of the antenna array 3211 including one or more antenna elements (not shown). The antenna elements may be omnidirectional, direction, or a combination thereof. The antenna elements may be formed in a multitude of arranges as are known and/or discussed herein. The antenna array 3211 may comprise microstrip antennas or printed antennas that are fabricated on the surface of one or more printed circuit boards. The antenna array 3211 may be formed in as a patch of metal foil (e.g., a patch antenna) in a variety of shapes, and may be coupled with the RF circuitry 3206 and/or FEM circuitry 3208 using metal transmission lines or the like.

Processors of the application circuitry 3005/3105 and processors of the baseband circuitry 3210 may be used to execute elements of one or more instances of a protocol stack. For example, processors of the baseband circuitry 3210, alone or in combination, may be used execute Layer 3, Layer 2, or Layer 1 functionality, while processors of the application circuitry 3005/3105 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 33:
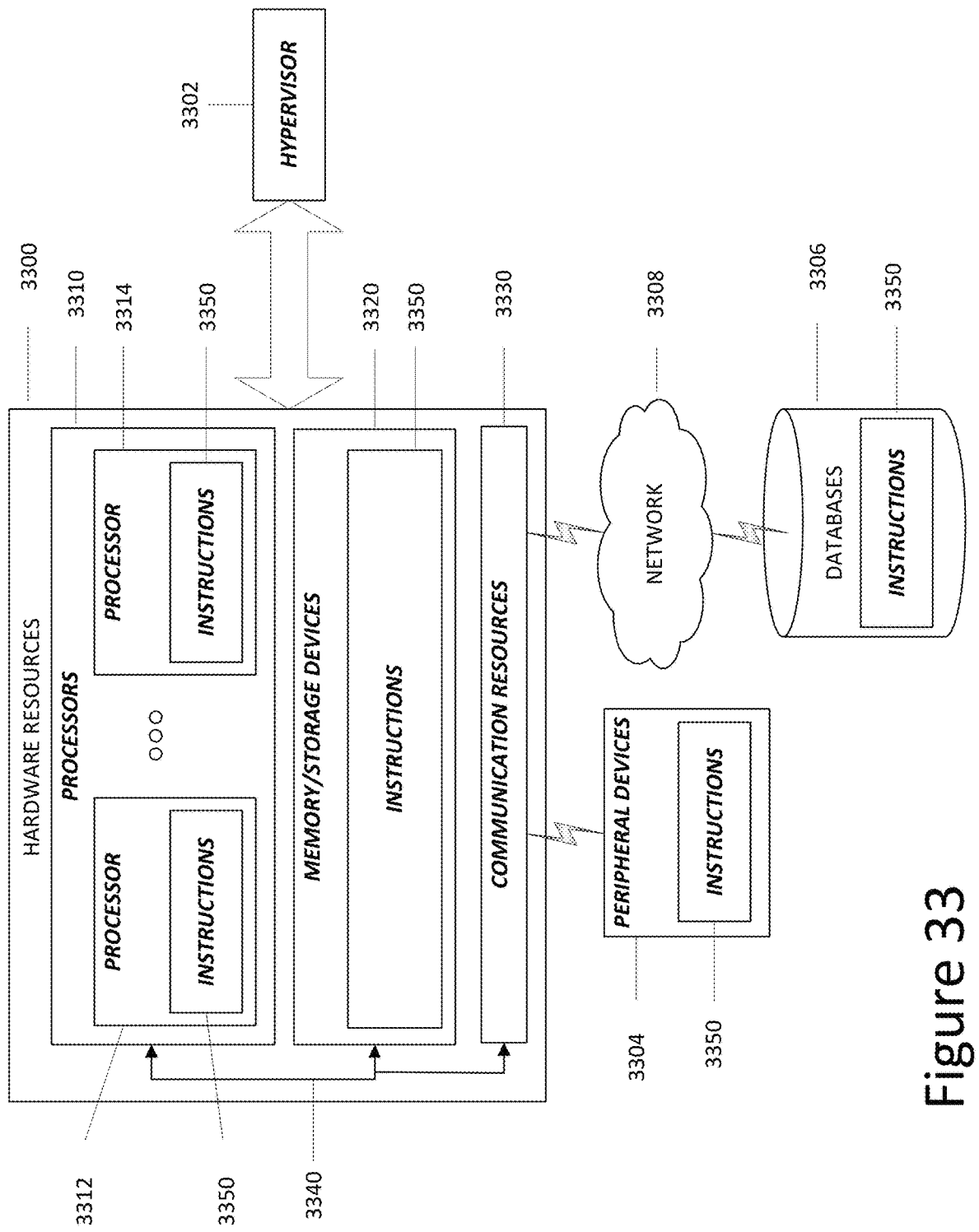
FIG. 33 is a block diagram illustrating components, according to some example embodiments, able to read instructions from a machine-readable or computer-readable medium (for example, a non-transitory machine-readable storage medium) and perform any one or more of the methodologies discussed herein.

FIG. 33 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 33 shows a diagrammatic representation of hardware resources 3300 including one or more processors (or processor cores) 3310, one or more memory/storage devices 3320, and one or more communication resources 3330, each of which may be communicatively coupled via a bus 3340. For embodiments where node virtualization (e.g., NFV) is utilized, a hypervisor 3302 may be executed to provide an execution environment for one or more network slices/sub-slices to utilize the hardware resources 3300.

The processors 3310 may include, for example, a processor 3312 and a processor 3314. The processor(s) 3310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 3320 may include main memory, disk storage, or any suitable combination thereof. The memory/storage devices 3320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 3330 may include interconnection or network interface components or other suitable devices to communicate with one or more peripheral devices 3304 or one or more databases 3306 via a network 3308. For example, the communication resources 3330 may include wired communication components (e.g., for coupling via USB), cellular communication components, NFC components, Bluetooth® (or Bluetooth® Low Energy) components, Wi-Fi® components, and other communication components.

Instructions 3350 may comprise software, a program, an application, an applet, an app, or other executable code for causing at least any of the processors 3310 to perform any one or more of the methodologies discussed herein. The instructions 3350 may reside, completely or partially, within at least one of the processors 3310 (e.g., within the processor's cache memory), the memory/storage devices 3320, or any suitable combination thereof. Furthermore, any portion of the instructions 3350 may be transferred to the hardware resources 3300 from any combination of the peripheral devices 3304 or the databases 3306. Accordingly, the memory of processors 3310, the memory/storage devices 3320, the peripheral devices 3304, and the databases 3306 are examples of computer-readable and machine-readable media.

Example Procedures

Figure 25:
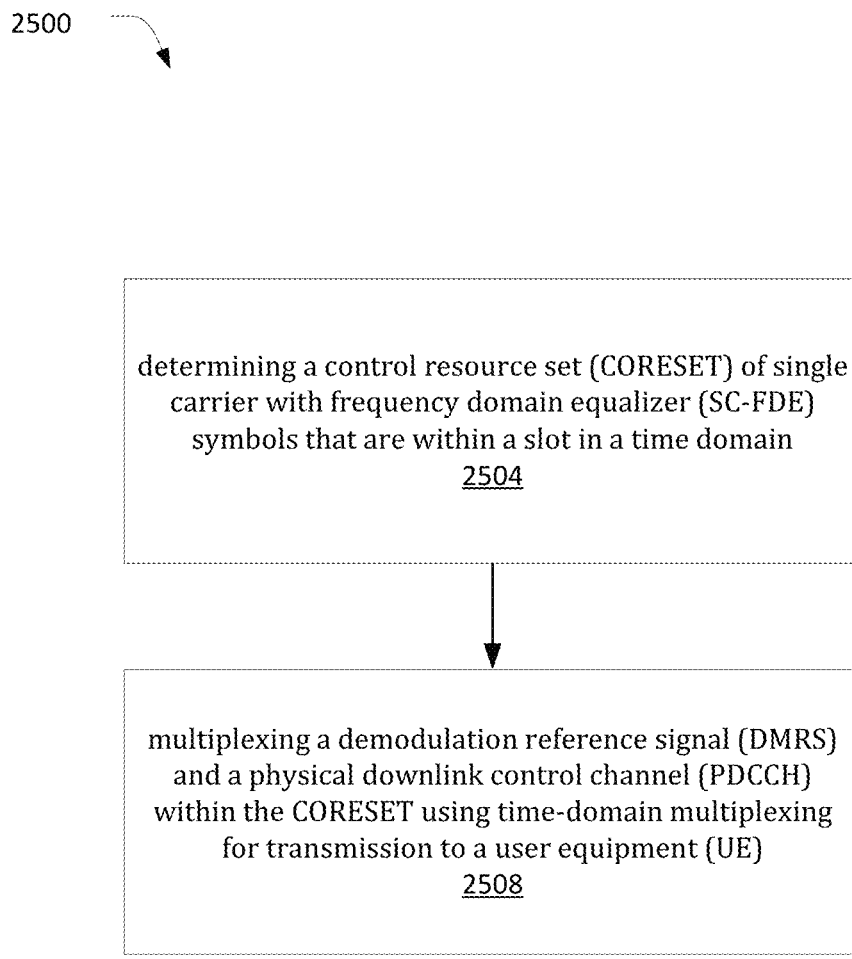
FIG. 25 illustrates a process of a next generation Node B (gNB) in accordance with various embodiments.

In some embodiments, the electronic device(s), network(s), system(s), chip(s) or component(s), or portions or implementations thereof, of FIGS. 29-33, or some other figure herein, may be configured to perform one or more processes, techniques, or methods as described herein, or portions thereof. One such process 2500 is depicted in FIG. 25.

For example, the process 2500 may include, at 2504, determining a control resource set (CORESET) of single carrier with frequency domain equalizer (SC-FDE) symbols that are within a slot in a time domain.

At 2508, the process 2500 may further include multiplexing a demodulation reference signal (DMRS) and a physical downlink control channel (PDCCH) within the CORESET using time-domain multiplexing for transmission to a user equipment (UE).

In some embodiments, the process 2500 may be performed by a gNB or a portion thereof (e.g., baseband circuitry of the gNB).

Figure 26:
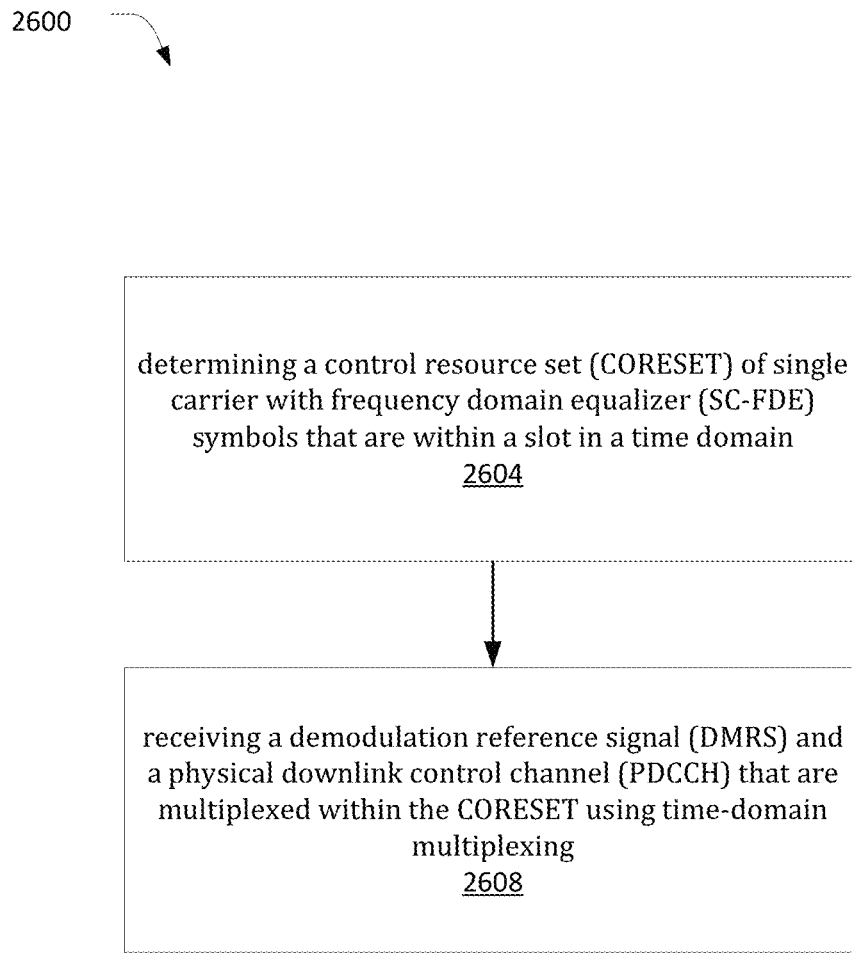
FIG. 26 illustrates a process of a user equipment (UE) in accordance with various embodiments.

FIG. 26 illustrates another process 2600 in accordance with various embodiments. The process 2600 may include, at 2604, determining a control resource set (CORESET) of single carrier with frequency domain equalizer (SC-FDE) symbols that are within a slot in a time domain.

The process 2600 may further include, at 2608, receiving a demodulation reference signal (DMRS) and a physical downlink control channel (PDCCH) that are multiplexed within the CORESET using time-domain multiplexing.

In some embodiments, the process 2600 may be performed by a UE or a portion thereof (e.g., baseband circuitry of the UE).

Figure 27:
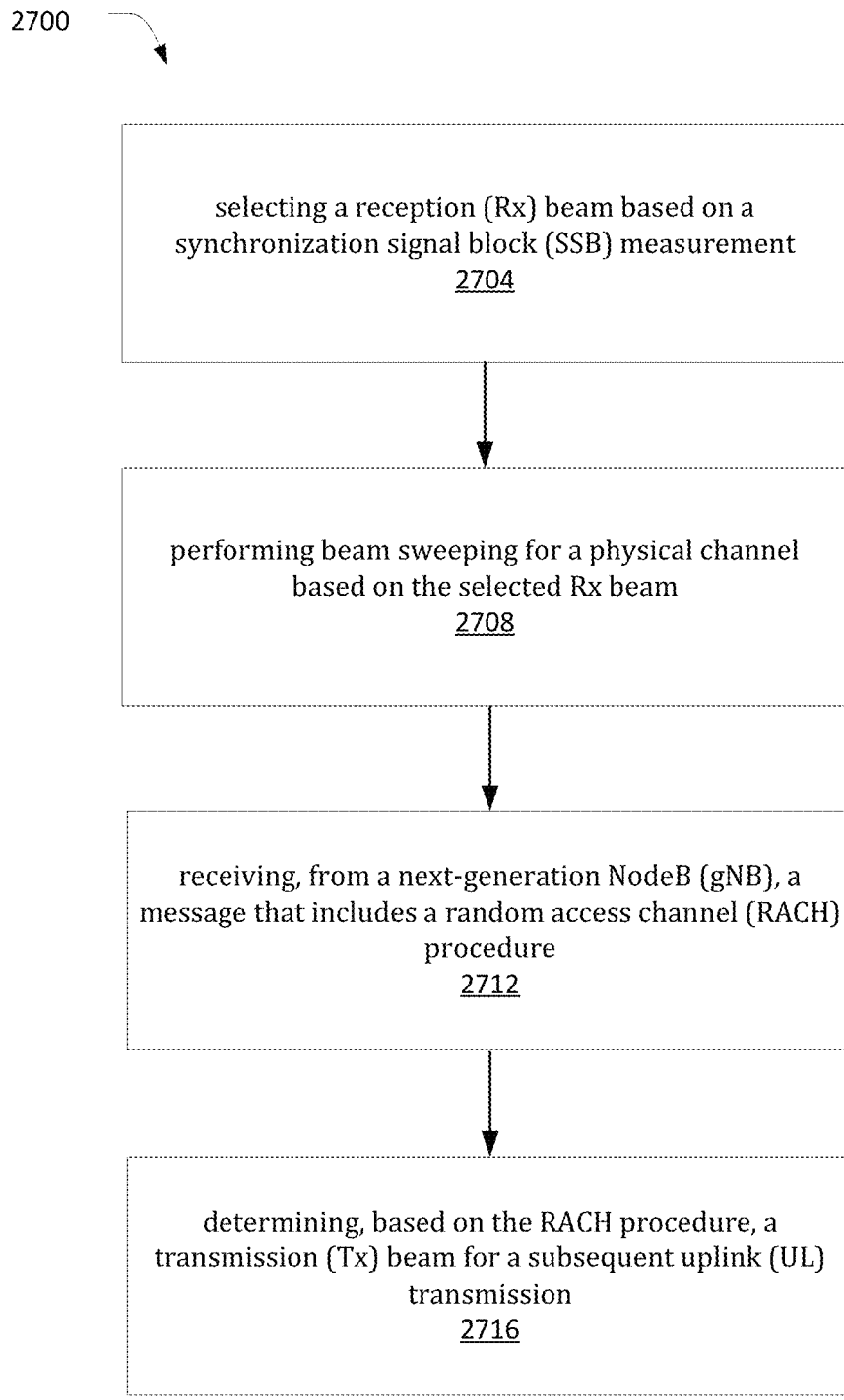
FIG. 27 illustrates another process of a UE in accordance with various embodiments.

FIG. 27 illustrates another process 2700 in accordance with various embodiments. The process 2700 may include, at 2704, selecting a reception (Rx) beam based on a synchronization signal block (SSB) measurement. The process 2700 further includes, at 2708, performing beam sweeping for a physical channel based on the selected Rx beam. The process 2700 further includes, at 2712, receiving, from a next-generation NodeB (gNB), a message that includes a random access channel (RACH) procedure. The process 2700 further includes, at 2716, determining, based on the RACH procedure, a transmission (Tx) beam for a subsequent uplink (UL) transmission.

In some embodiments, the process 2700 may be performed by a UE or a portion thereof (e.g., baseband circuitry of the UE).

Figure 28:
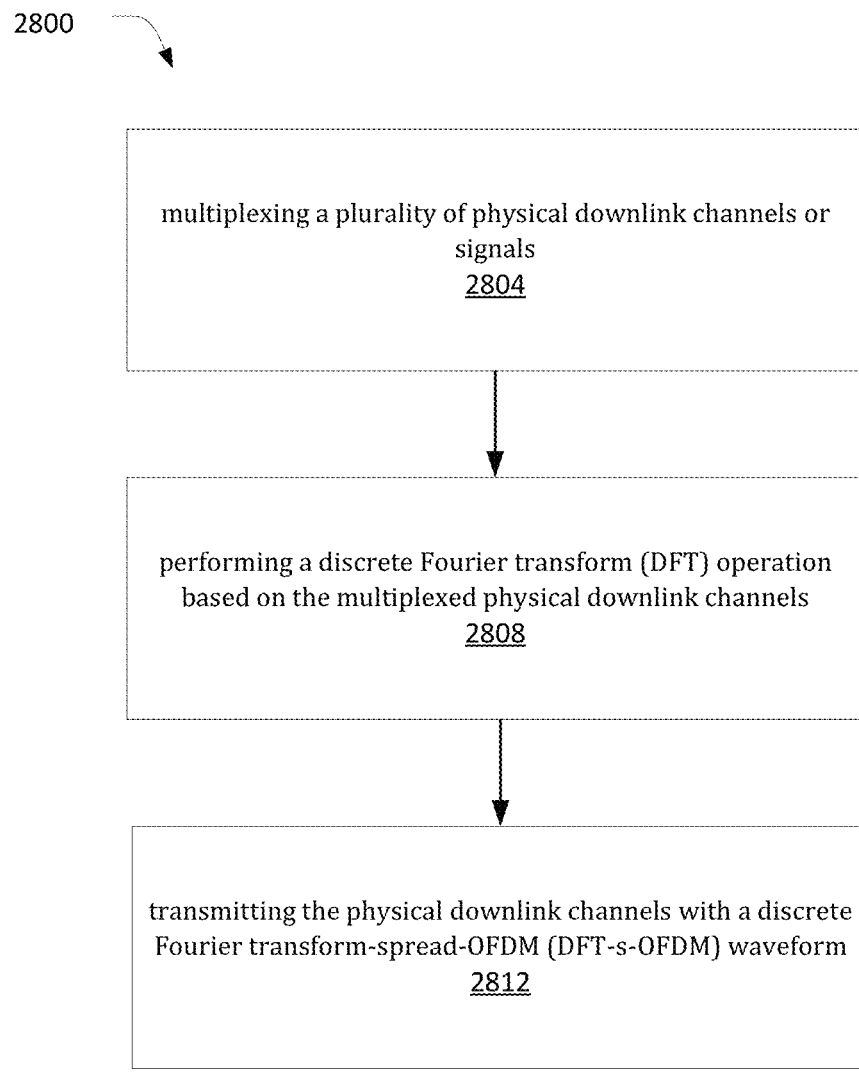
FIG. 28 illustrates another process of a gNB in accordance with various embodiments.

FIG. 28 illustrates another process 2800 in accordance with various embodiments. The process 2800 may include, at 2804, multiplexing a plurality of physical downlink channels or signals. The process 2800 may further include, at 2808, performing a discrete Fourier transform (DFT) operation based on the multiplexed physical downlink channels. The process 2800 may further include, at 2812, transmitting the physical downlink channels with a discrete Fourier transform-spread-OFDM (DFT-s-OFDM) waveform.

In some embodiments, the process 2800 may be performed by a gNB or a portion thereof (e.g., baseband circuitry of the gNB).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication for a fifth generation (5G) or new radio (NR) system, the method comprising:
Transmitting, by gNodeB (gNB), one or more physical downlink control channels (PDCCH) using single carrier based waveform;
Transmitting, by gNB, a demodulation reference signal (DMRS) associated with the PDCCH transmission.

Example 2 may include the method of example 1 or some other example herein, wherein the single carrier waveform can be single carrier with frequency domain equalizer (SC-FDE) using guard interval (GI), unique word (UW) or cyclic prefix (CP).

Example 3 may include the method of example 1 or some other example herein, wherein the DMRS is multiplexed with the PDCCHs in a time division multiplexing (TDM) manner within a control resource set (CORESET).

Example 4 may include the method of example 1 or some other example herein, wherein a control resource set (CORESET) is defined in term of the number of data blocks or SC-FDE symbols within a slot in time domain.

Example 5 may include the method of example 1 or some other example herein, wherein multiple PDCCHs can be multiplexed in a TDM manner within a CORESET.

Example 6 may include the method of example 1 or some other example herein, wherein resource element group (REG) and/or control channel element (CCE) for the transmission of PDCCH can span N_REG and N_CCE samples within a SC-FDE symbol, respectively.

Example 7 may include the method of example 1 or some other example herein, wherein a time first mapping can be applied for CCE-to-REG mapping in time domain within a CORESET for the transmission of PDCCH.

Example 8 may include the method of example 1 or some other example herein, wherein PDCCH and associated DMRS may be multiplexed in a TDM manner within a SC-FDE symbol.

Example 9 may include the method of example 1 or some other example herein, wherein single DMRS antenna port (AP) is defined for the PDCCH transmission with SC-FDE waveform Example 10 may include the method of example 1 or some other example herein, wherein multiple DMRS APs can be defined for the PDCCH transmission with SC-FDE waveform.

Example 11 may include the method of example 1 or some other example herein, wherein a default DMRS AP may be predefined in the specification or configured by higher layers via NR minimum system information (MSI) or NR remaining minimum system information (RMSI) if the CORESET is configured by the physical broadcast channel (PBCH) or by the controlResourceSetZero field in the PDCCH-ConfigCommon IE.

Example 12 may include the method of example 1 or some other example herein, wherein for PDCCH with common search space using SC-FDE waveform, the DMRS AP may be configured by higher layers via MSI or RMSI or radio resource control (RRC) signaling.

Example 13 may include the method of example 1 or some other example herein, wherein for PDCCH with UE specific search space using SC-FDE waveform, the DMRS AP may be configured by higher layers via RRC signaling in a UE specific manner.

Example 14 may include the method of example 1 or some other example herein, wherein for the DMRS sequence generation for PDCCH with SC-FDE waveform, the scrambling ID may be configured by higher layer via MSI or RMSI or RRC signaling.

Example 15 may include a method comprising:
determining a control resource set (CORESET) of single carrier with frequency domain equalizer (SC-FDE) symbols that are within a slot in a time domain; and
multiplexing a demodulation reference signal (DMRS) and a physical downlink control channel (PDCCH) within the CORESET using time-domain multiplexing for transmission to a user equipment (UE).

Example 16 may include the method of example 15 or some other example herein, wherein the SC-FDE symbols are transmitted on a carrier frequency greater than 52.6 GHz.

Example 17 may include the method of example 15-16 or some other example herein, wherein the CORESET includes 2 to 4 SC-FDE symbols.

Example 18 may include the method of example 15-17 or some other example herein, further comprising inserting a cyclic prefix, guard interval, or unique word at the beginning or end of individual SC-FDE symbols within the CORESET.

Example 19 may include the method of example 15-18 or some other example herein, wherein multiplexing the DMRS and the PDCCH includes encoding the DMRS for transmission in a first SC-FDE of the CORESET that occurs earliest in the time domain.

Example 20 may include the method of example 15-19 or some other example herein, wherein the PDCCH is a first PDCCH, and wherein the multiplexing includes multiplexing the DMRS with a plurality of PDCCHs, including the first PDCCH, within the CORESET.

Example 21 may include the method of example 15-20 or some other example herein, wherein the multiplexing includes multiplexing the DMRS with the PDCCH in a same SC-FDE symbol within the CORESET.

Example 22 may include the method of example 21 or some other example herein, wherein the multiplexing includes inserting a portion of a cyclic prefix, guard interval, or unique word between the DMRS and the PDCCH.

Example 23 may include the method of example 22 or some other example herein, wherein the portion is a first portion, and wherein the method further comprises inserting a second portion of the cyclic prefix, guard interval, or unique word at the beginning of the same SC-FDE symbol.

Example 24 may include the method of example 15-23 or some other example herein, further comprising transmitting or causing to transmit configuration information to indicate the SC-FDE symbols included in the CORESET.

Example 25 may include the method of example 15-24 or some other example herein, further comprising transmitting or causing to transmit, to the UE, scheduling information to indicate resources within the CORESET on which the DMRS and/or PDCCH are to be transmitted.

Example 26 may include the method of example 25 or some other example herein, wherein the scheduling information includes an indication of a DMRS antenna port on which the DMRS is to be transmitted.

Example 27 may include the method of example 15-26 or some other example herein, wherein the DMRS is transmitted using a DMRS antenna port that is designated for PDCCH transmission on SC-FDE symbols.

Example 28 may include the method of example 15-27 or some other example herein, wherein the method is performed by a next generation Node B (gNB) or a portion thereof.

Example 29 may include a method comprising:
determining a control resource set (CORESET) of single carrier with frequency domain equalizer (SC-FDE) symbols that are within a slot in a time domain; and
receiving a demodulation reference signal (DMRS) and a physical downlink control channel (PDCCH) that are multiplexed within the CORESET using time-domain multiplexing.

Example 30 may include the method of example 29 or some other example herein, wherein the SC-FDE symbols are received on a carrier frequency greater than 52.6 GHz.

Example 31 may include the method of example 29-30 or some other example herein, wherein the CORESET includes 2 to 4 SC-FDE symbols.

Example 32 may include the method of example 29-31 or some other example herein, further comprising receiving a cyclic prefix, guard interval, or unique word at the beginning or end of individual SC-FDE symbols within the CORESET.

Example 33 may include the method of example 29-32 or some other example herein, wherein the DMRS is received in a first SC-FDE of the CORESET that occurs earliest in the time domain.

Example 34 may include the method of example 29-33 or some other example herein, wherein the PDCCH is a first PDCCH, and wherein a plurality of PDCCHs, including the first PDCCH, are multiplexed with the DMRS within the CORESET.

Example 35 may include the method of example 34 or some other example herein, wherein one or more of the plurality of PDCCHs are designated for another UE.

Example 36 may include the method of example 34-35 or some other example herein, wherein two or more of the plurality of PDCCHs are designated for the UE.

Example 37 may include the method of example 29-36 or some other example herein, wherein the DMRS is multiplexed with the PDCCH in a same SC-FDE symbol within the CORESET.

Example 38 may include the method of example 37 or some other example herein, further comprising receiving a portion of a cyclic prefix, guard interval, or unique word between the DMRS and the PDCCH.

Example 39 may include the method of example 38 or some other example herein, wherein the portion is a first portion, and wherein the method further comprises receiving a second portion of the cyclic prefix, guard interval, or unique word at the beginning of the same SC-FDE symbol.

Example 40 may include the method of example 29-39 or some other example herein, further comprising receiving configuration information to indicate the SC-FDE symbols included in the CORESET.

Example 41 may include the method of example 29-40 or some other example herein, further comprising receiving scheduling information to indicate resources within the CORESET on which the DMRS and/or PDCCH are to be transmitted.

Example 42 may include the method of example 41 or some other example herein, wherein the scheduling information includes an indication of a DMRS antenna port on which the DMRS is to be transmitted.

Example 43 may include the method of example 29-42 or some other example herein, wherein the DMRS is received on a DMRS antenna port that is designated for PDCCH transmission on SC-FDE symbols.

Example 44 may include the method of example 29-43 or some other example herein, wherein the DMRS and the PDCCH are received from a next generation Node B (gNB).

Example 45 may include the method of example 29-44 or some other example herein, wherein the method is performed by a UE or a portion thereof.

Example 46 includes a method of wireless communication for a fifth generation (5G) or new radio (NR) system, the method comprising: receiving, by a UE, a bitmap for the actually used beams for synchronization signal block (SSB) transmission; and determining, by the UE, the SSS position for physical downlink shared channel (PDSCH) for rate-matching.

Example 47 includes the method of example 46 and/or some other example(s) herein, wherein when 8-bit bitmap is defined, e.g., reusing ssb-PositionsInBurst, and when the number of beams, i.e., Q is less than 8, the first Q bits are used to indicate the actually used beam for SSB transmission; wherein the remaining (8-Q) bits may be repeated based on the first Q bits or may be set to "0".

Example 48 includes the method of example 46 and/or some other example(s) herein, wherein For above 52.GHz carrier frequency with unlicensed spectrum, SSB candidate positions may exist in each slot within a DRS window, where the DRS window may be predefined in the specification, e.g., 1 ms or 5 ms, or configured by higher layers via NR minimum system information (MSI), NR remaining minimum system information (RMSI), NR other system information (OSI) or radio resource control (RRC) signalling.

Example 49 includes the method of example 46 and/or some other example(s) herein, wherein 16 bit indication, ssb-PositionsInBurst, can be used to indicate the used beam for the transmission of SSBs within a DRS window.

Example 50 includes the method of example 46 and/or some other example(s) herein, wherein first 8 bits are used to indicate the presence of SSB block groups, while the second 8 bits are used to indicate the position of used beams within a SSB group with 8 SSB positions, where the first $\lceil Q/8 \rceil$ bits are used to indicate that the used beam in each group and the remaining 8-$\lceil Q/8 \rceil$ bits may be set to 0 or repeated version of first $\lceil Q/8 \rceil$ bits if Q<=64; wherein the pattern for used beam for 64 SSB candidate positions is repeated within a DRS window.

Example 51 includes the method of example 46 and/or some other example(s) herein, wherein a field, e.g., 1 bit indicator in the DCI format 1_0 and/or 1_1 can be used to indicate whether PDSCH is rate-matched around the SSB in a same slot.

Example 52 includes the method of example 46 and/or some other example(s) herein, wherein rate-matching resource can be configured referring to one or two SSB positions in time and frequency resource within a slot.

Example 53 includes the method of example 46 and/or some other example(s) herein, wherein one field in the DCI format 1_0 and/or 1_1 for scheduling PDSCH can be used to indicate whether SSB is not transmitted when overlapping with PUCCH carrying HARQ-ACK feedback. In particular, bit "1" may be used to indicate that SSB is actually transmitted when overlapping with the PUCCH in time.

Example 54 includes the method of example 46 and/or some other example(s) herein, wherein a group common physical downlink control channel (PDCCH) may be used to carry a bitmap on whether the corresponding SSB is actually transmitted for PDSCH rate-matching.

Example 55 may include a method of wireless communication for a fifth generation (5G) or new radio (NR) system comprising:
  determining, by a user equipment (UE), a best gNB Tx beam and UE Rx beam in accordance with synchronization signal block (SSB) measurement;
  performing, by the UE, beam sweeping for the transmission of physical random access channel (PRACH) and/or physical uplink shared channel (PUSCH); and
  transmitting, by a gNB, a message (MsgB) in accordance with the best gNB Tx beam.

Example 56 may include the method of example 55 or some other example herein, wherein the SSB index corresponding to the best gNB Tx beam is carried by the PUSCH Example 57 may include the method of example 55 or some other example herein, wherein PRACH and/or PUSCH resource index, corresponding to the best UE Tx beam is included in the MsgB.

Example 58 may include the method of example 55 or some other example herein, wherein SSB index which corresponds to the best gNB Tx beam may be implicitly carried by PRACH transmission.

Example 59 may include the method of example 55 or some other example herein, wherein PRACH preambles may be grouped into multiple PRACH preamble sets, wherein in each PRACH preamble set, preamble index is used to carry the information regarding SSB index.

Example 60 may include the method of example 55 or some other example herein, wherein UE performs beam sweeping for PRACH preamble transmission in RACH occasions which are associated with the detected SSB index, in accordance with association between SSB and PRACH occasion.

Example 61 may include the method of example 55 or some other example herein, wherein same preamble index is applied during beam sweeping.

Example 62 may include the method of example 55 or some other example herein, wherein the SSB index may be jointly carried by MsgA PUSCH for 2-step RACH and implicitly indicated by PRACH transmission.

Example 63 may include the method of example 55 or some other example herein, wherein PRACH and PUSCH for a single MsgA transmission are transmitted consecutively in time domain during beam sweeping.

Example 64 may include the method of example 55 or some other example herein, wherein PRACH and PUSCH in one MsgA are transmitted separately in time domain during beam sweeping.

Example 65 may include the method of example 55 or some other example herein, wherein the number of beams or PRACH and/or PUSCH repetition may be configured by higher layers via NR minimum system information (MSI), NR remaining minimum system information (RMSI), NR other system information (OSI) or radio resource control (RRC) signaling.

Example 66 may include the method of example 55 or some other example herein, wherein PRACH resource grouping or different PRACH occasions in time or frequency domain may be used to indicate the number of beams or PRACH and/or PUSCH repetitions.

Example 67 may include the method of example 55 or some other example herein, wherein Tx beam for the transmission of MsgB for 2-step RACH procedure or Msg2 for 4-step RACH is either based on the detected SSB index carried by PUSCH or the SSB that UE used for PRACH association.

Example 68 may include the method of example 55 or some other example herein, wherein the PRACH and/or PUSCH resource index may be defined as the PRACH and/or PUSCH resource index in time domain.

Example 69 includes a method comprising:
  selecting a reception (Rx) beam based on a synchronization signal block (SSB) measurement;
  performing beam sweeping for a physical channel based on the selected Rx beam;
  receiving, from a next-generation NodeB (gNB), a message that includes a random access channel (RACH) procedure; and
  determining, based on the RACH procedure, a transmission (Tx) beam for a subsequent uplink (UL) transmission.

Example 70 includes the method of example 69 or some other example herein, wherein the method further includes determining a gNB Tx beam to be applied for subsequent downlink (DL) control and data transmission.

Example 71 includes the method of example 69 or some other example herein, wherein the physical channel is a physical random access channel (PRACH) or a physical uplink shared channel (PUSCH).

Example 72 includes the method of example 71 or some other example herein, wherein performing the beam sweeping includes transmitting, to the gNB, a first message (MsgA) that includes both a PRACH transmission and a PUSCH transmission.

Example 73 includes the method of example 72 or some other example herein, wherein the PUSCH transmission includes an indication of an SSB index corresponding to the determined gNB Tx beam.

Example 74 includes the method of example 69 or some other example herein, wherein the RACH procedure is a two-step RACH procedure or a four-step RACH procedure.

Example 75 includes the method of any of examples 69-74 or some other example herein, wherein the method is performed by a user equipment (UE) or portion thereof.

Example 76 may include a method of wireless communication for a fifth generation (5G) or new radio (NR) system comprising:
- multiplexing, by a gNB, a physical broadcast channel (PBCH) and other physical downlink channels or signals in a time division multiplexing (TDM) manner prior to Discrete Fourier Transform (DFT) operation; and
- transmitting, by the gNB, the PBCH and the other physical downlink channels or signals in a same symbol with Discrete Fourier Transform-spread-OFDM (DFT-s-OFDM) waveform.

Example 77 may include the method of example 76 or some other example herein, wherein physical downlink channels may include at least one of the following: physical downlink shared channel (PDSCH) carrying common control message including NR remaining minimum system information (RMSI), paging, random access response (RAR), PDSCH carrying unicast data, physical downlink control channel (PDCCH).

Example 78 may include the method of example 76 or some other example herein, wherein a same DFT size is applied for the transmission of PBCH and other DL channels.

Example 79 may include the method of example 76 or some other example herein, wherein the starting PRB may be defined as the PRB offset between PSS and/or SSS and PBCH transmission.

Example 80 may include the method of example 76 or some other example herein, wherein position of PBCH within the DFT size prior to DFT operation should be predefined in the specification.

Example 81 may include the method of example 76 or some other example herein, wherein PBCH and other DL physical channels and/or signals may be multiplexed in a time division multiplexing (TDM) manner in a slot and across slots.

Example 82 may include the method of example 76 or some other example herein, wherein SSS and/or DMRS associated with PBCH transmission may be used for the channel estimation of other DL physical channels, e.g., PDCCH for scheduling common control messages or PDSCH containing SIB1, paging message, RAR.

Example 83 may include the method of example 76 or some other example herein, wherein SSS or PBCH and other DL physical channels and/or signals may be multiplexed in a spatial division multiplexing (SDM) manner.

Example 84 may include the method of example 76 or some other example herein, wherein ssb-PositionsInBurst may be fixed to all zero to indicate that PDSCH can be transmitted in SSB positions.

Example 85 may include the method of example 76 or some other example herein, wherein whole slot may be allocated for SSB beam sweeping; wherein SSB may across the slot boundary if slot has 14 symbols.

Example 86 may include the method of example 76 or some other example herein, wherein when PBCH DMRS is used for channel estimation of other DL physical channels, SSB may be allocated at the beginning of one slot or half slot.

Example 87 may include the method of example 76 or some other example herein, wherein when the number of symbols for SSB transmission is 5, first two symbols in half slot boundary may be reserved for other DL physical channels/signals; wherein SSB can be allocated in the remaining part of half slots within one slot.

Example 88 includes a method comprising:
- multiplexing a plurality of physical downlink channels or signals;
- performing a discrete Fourier transform (DFT) operation based on the multiplexed physical downlink channels; and
- transmitting the physical downlink channels with a discrete Fourier transform-spread-OFDM (DFT-s-OFDM) waveform.

Example 89 includes the method of example 88 or some other example herein, wherein the physical downlink channels include a physical broadcast channel (PBCH).

Example 90 includes the method of example 88 or some other example herein, wherein the physical downlink channels are transmitted in a common DFT-s_OFDM symbol.

Example 91 includes the method of example 88 or some other example herein, wherein the physical downlink channels include a physical downlink shared channel (PDSCH) carrying a common control message.

Example 92 includes the method of example 88 or some other example herein, wherein the physical downlink channels have a common DFT size.

Example 93 includes the method of example 88 or some other example herein, wherein the physical downlink channels are transmitted in different symbols within a slot.

Example 94 includes the method of example 88 or some other example herein, wherein the physical downlink channels are multiplexed in a time division multiplexing (TDM) manner.

Example 95 includes the method of example 88 or some other example herein, wherein the physical downlink channels are multiplexed in a spatial division multiplexing (SDM) manner.

Example 96 includes the method of any one of examples 88-95, wherein the method is performed by a next-generation NodeB (gnB) or portion thereof.

Example Z01 may include an apparatus comprising means to perform one or more elements of a method described in or related to any of examples 1-96, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-96, or any other method or process described herein.

Example Z03 may include an apparatus comprising logic, modules, or circuitry to perform one or more elements of a method described in or related to any of examples 1-96, or any other method or process described herein.

Example Z04 may include a method, technique, or process as described in or related to any of examples 1-96, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-96, or portions thereof.

Example Z06 may include a signal as described in or related to any of examples 1-96, or portions or parts thereof.

Example Z07 may include a datagram, packet, frame, segment, protocol data unit (PDU), or message as described in or related to any of examples 1-96, or portions or parts thereof, or otherwise described in the present disclosure.

Example Z08 may include a signal encoded with data as described in or related to any of examples 1-96, or portions or parts thereof, or otherwise described in the present disclosure.

Example Z09 may include a signal encoded with a datagram, packet, frame, segment, protocol data unit (PDU), or message as described in or related to any of examples 1-96, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-96, or portions thereof.

Example Z11 may include a computer program comprising instructions, wherein execution of the program by a processing element is to cause the processing element to carry out the method, techniques, or process as described in or related to any of examples 1-96, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signaling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HOHandover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCD Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signaling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor NSR Network Service Record
NSSAI 'Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signaling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastructure
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a next generation Node B (gNB) to perform operations comprising:
   determine a control resource set (CORESET) that includes at least three single carrier with frequency domain equalizer (SC-FDE) symbols that are within a slot in a time domain, wherein a first SC-FDE symbol and a third SC-FDE symbol in the CORESET include information related to a physical downlink channel (PDCCH) and wherein a second SC-FDE symbol positioned between the first SC-FDE symbol and the third SC-FDE symbol in the time domain includes information related to a demodulation reference signal (DMRS); and
   transmit the CORESET to a user equipment (UE).

2. The one or more NTCRM of claim 1, wherein the SC-FDE symbols are transmitted on a carrier frequency greater than 52.6 GHz, and wherein the CORESET includes 3 or 4 SC-FDE symbols.

3. The one or more NTCRM of claim 1, wherein the operations further comprise inserting a cyclic prefix, guard interval, or unique word at the beginning or end of individual SC-FDE symbols within the CORESET.

4. The one or more NTCRM of claim 1, wherein the information related to the DMRS is multiplexed with information related to the PDCCH in the second SC-FDE symbol within the CORESET.

5. The one or more NTCRM of claim 4, wherein the multiplexing includes:
   inserting a first portion of a cyclic prefix, guard interval, or unique word between the second SC-FDE symbol and the first or the third SC-FDE symbols; and
   inserting a second portion of the cyclic prefix, guard interval, or unique word at the beginning of the second SC-FDE symbol.

6. The one or more NTCRM of claim 1, wherein the operations further comprise transmitting, to the UE, scheduling information to indicate resources within the CORESET on which the DMRS or PDCCH are to be transmitted, wherein the scheduling information includes an indication of a DMRS antenna port on which the DMRS is to be transmitted.

7. The one or more NTCRM of claim 1, wherein the DMRS is transmitted using a DMRS antenna port that is designated for PDCCH transmission on SC-FDE symbols.

8. One or more non-transitory computer-readable media (NTCRM) having instructions, stored thereon, that when executed by one or more processors cause a user equipment (UE) to perform operations comprising:
   identify a received control resource set (CORESET) that includes at least three single carrier with frequency domain equalizer (SC-FDE) symbols within a slot in a time domain, wherein a first and third SC-FDE symbol in the CORESET include information related to a physical downlink control channel (PDCCH) and wherein a second SC-FDE symbol positioned between the first and third SC-FDE symbol in the time domain includes information related to a demodulation reference signal (DMRS); and
   processing the PDCCH based on the CORESET.

9. The one or more NTCRM of claim 8, wherein the SC-FDE symbols are received on a carrier frequency greater than 52.6 GHz, and wherein the CORESET includes 3 or 4 SC-FDE symbols.

10. The one or more NTCRM of claim 8, wherein the operations further comprise receiving a cyclic prefix, guard interval, or unique word at the beginning or end of individual SC-FDE symbols within the CORESET.

11. The one or more NTCRM of claim 8, wherein the second SC-FDE symbol includes information related to the PDCCH multiplexed with the information related to the DMRS.

12. The one or more NTCRM of claim 11, wherein the operations further comprise:
   identifying a first portion of a cyclic prefix, guard interval, or unique word between the information related to the DMRS and the information related to the PDCCH in the second SC-FDE symbol; and
   identifying a second portion of the cyclic prefix, guard interval, or unique word at the beginning of the second SC-FDE symbol.

13. The one or more NTCRM of claim 8, wherein the operations further comprise receiving scheduling information to indicate resources within the CORESET on which the DMRS or PDCCH are to be transmitted.

14. The one or more NTCRM of claim 13, wherein the scheduling information includes an indication of a DMRS antenna port on which the DMRS is to be transmitted.

15. The one or more NTCRM of claim 8, wherein the DMRS is received on a DMRS antenna port that is designated for PDCCH transmission on SC-FDE symbols.

* * * * *